US007006633B1

(12) United States Patent
Reece

(10) Patent No.: US 7,006,633 B1
(45) Date of Patent: Feb. 28, 2006

(54) GLOBAL ENCRYPTION SYSTEM

(75) Inventor: Richard W. Reece, Lee, NH (US)

(73) Assignee: Global Encryption Standard Corporation, Washington, DC (US)

( * ) Notice: Subject to any disclaimer, the term of this patent is extended or adjusted under 35 U.S.C. 154(b) by 626 days.

(21) Appl. No.: 09/617,913

(22) Filed: Jul. 17, 2000

Related U.S. Application Data

(60) Provisional application No. 60/144,066, filed on Jul. 16, 1999.

(51) Int. Cl.
H04L 9/00 (2006.01)
(52) U.S. Cl. ...................................... 380/260; 380/277
(58) Field of Classification Search .................. 380/28, 380/277–279, 259–262; 713/150, 201
See application file for complete search history.

(56) References Cited

U.S. PATENT DOCUMENTS

| 3,364,308 | A | | 1/1968 | Vasseur |
| 3,515,805 | A | | 6/1970 | Fracassi et al. |
| 5,003,598 | A | * | 3/1991 | Kunstadt ........................ 380/6 |
| 5,091,942 | A | * | 2/1992 | Dent ........................... 380/46 |
| 5,153,919 | A | | 10/1992 | Reeds, III et al. |
| 5,161,244 | A | * | 11/1992 | Maurer ......................... 380/43 |
| 5,440,640 | A | | 8/1995 | Anshel et al. |
| 5,541,996 | A | | 7/1996 | Ridenour |
| 5,592,553 | A | | 1/1997 | Guski et al. |
| 5,664,099 | A | * | 9/1997 | Ozzie et al. ................. 713/200 |
| 5,675,653 | A | | 10/1997 | Nelson, Jr. |
| 5,841,872 | A | | 11/1998 | Colvin, Sr. |
| 5,850,450 | A | * | 12/1998 | Schweitzer et al. ........... 380/30 |
| 5,966,450 | A | | 10/1999 | Hosford et al. |
| 6,023,689 | A | | 2/2000 | Herlin et al. |
| 6,035,041 | A | | 3/2000 | Frankel et al. |
| 6,067,620 | A | | 5/2000 | Holden et al. |
| 6,094,487 | A | | 7/2000 | Butler et al. |
| 6,430,170 | B1 | * | 8/2002 | Saints et al. ................. 370/335 |

FOREIGN PATENT DOCUMENTS

EP 0223781 * 11/1995

OTHER PUBLICATIONS

Michael O. Rabin, Transaction Protection by Beacons, Journal of Computer and System Sciences 27, 256-267, 1983.*
"Discrete Mathematics and Its Applications", K. Rosen, Handbook of Applied Cryptography, CRC Press.

* cited by examiner

*Primary Examiner*—Kim Vu
*Assistant Examiner*—Ponnoreay Pich
(74) *Attorney, Agent, or Firm*—Patton Boggs LLP

(57) ABSTRACT

A system and method for encryption, transmission and decryption of data based on a publicly or other wide area broadcast random number sequence. Encryption is by a selected subsequence from the broadcast random number sequence, the selection being at a sample time relative to a synchronization event, with the sample time calculated based on a private key. Decryption uses the same private key to select the same subsequence from the broadcast random number sequence, as detection by the sender and receiver of the synchronization event and a sampling time based on a commonly known private key allows the sampling to be synchronous. Alternative embodiments employ trusted agents if the tender and receiver do not have a common private key.

14 Claims, 9 Drawing Sheets

GLOBAL ENCRYPTION SYSTEM

This application claims priority from Ser. No. 60/144,066 filed Jul. 7,1999.

FIELD OF THE INVENTION

This invention relates generally to the field of data encryption and, more particularly, to a method and apparatus for encryption, transmission and decryption utilizing a broadcast random data sequence accessible by the sender and receiver.

DESCRIPTION OF THE RELATED ART

In recent years, several papers and patents have disclosed advances in developing information—theoretically secure cryptosystems. Where possible, information—theoretically secure systems have substantial advantages over cryptosystems based on assumptions of an adversary's processing power. Such computational systems include public key systems and some private key systems such as the Digital Encryption Standard (DES) and Advanced Encryption Standards (AES). One advantage of information—theoretically secure systems is security: information—theoretically secure systems implicitly assume that an adversary has unlimited computing power, so such cryptosystems are generally regarded as having achieved the "unbreakable" status of at one-time pad. In contrast, cryptosystems that base their security on an adversary's estimated processing power cannot achieve this status and so are less secure.

In most existing cryptosystems, the process of creating security, in terms of uncertainty about the plaintext, and the process of encryption, i.e., transferring that uncertainty to the plaintext, are inseparable. In the current art of most private key and all public key systems, the message must exist before security can be created, and often the message itself is an input to the key. It is so common that it is unusual in the current art to suggest that the "encryption" process may be broken into two separate conceptual operations, but it is crucial to do so in order to highlight the advantages of the present invention.

The structure of most information—theoretically secure systems has a distinct advantage that enables the actual process of transforming the plaintext into an indecipherable ciphertext to take place at extremely high speed, usually with a bare minimum of processing power. This speed is achieved by separating the randomization process, the creation of the uncertainty that an adversary will confront, from the process of transforming the plaintext into ciphertext. This separation is created when information—theoretically secure systems form the equivalent of a "one time pad" of random numbers that both users possess but about which the potential adversary has no information. The actual encryption process is a simple XOR (modulo 2) operation that transfers the uncertainty of the random numbers to the message. The result is less time between message creation, encryption, and transmission.

| Message | | XOR bit (random bit stream) | | Result |
|---|---|---|---|---|
| 0 | ⇒ | 0 | ⇒ | 0 |
| 1 | ⇒ | 1 | ⇒ | 0 |
| 1 | ⇒ | 0 | ⇒ | 1 |
| 0 | ⇒ | 1 | ⇒ | 1 |

The vast majority of the costs, measured in terms of time, resources, and processing power, associated with the one time pad are correlated with the process of creating and distributing security, i.e., the uncertainty, and not the actual process of encrypting the plaintext message, e.g., the XOR operation. This suggests that the real costs of any encryption system are created by the production of uncertainty, or to use another word, randomness.

The one-time pad is the original information—theoretically secure cryptosystem and remains the foundation at the base of the more recent cryptosystems that achieve provably secure status. The one-time pad is the core cryptosystem proven to be unbreakable in theory (Claude Shannon, in the "Communication Theory of Secrecy Systems", *Bell System Technical Journal*, Volume 28, October 1949, Pp. 656–715.), and it allows for rapid and unambiguous encipherment and decipherment. Its difficulties, however, are also well known, and these sharply limit its use to circumstances that require absolute secrecy and have few time or cost restrictions.

The main difficulty with the one-time pad resides in the broad category of key management. The key management problem may be broken into two components: key distribution and actual key management by users. The latter component was a larger challenge in the years before the advent of massive amounts of cheap computer storage, when large quantities of random numbers had to be printed on pads and controlled by the users. Since that time, the huge increase in computer memory capacity has mitigated the storage problems by allowing very large files of random numbers to be inexpensively stored for long periods of time and managed. Access to these pads remains a strong security concern, but that is true of any cryptosystem. The remaining challenge is key distribution.

More specifically, in existing methods of key distribution, large "pads", which are now computer files, of random numbers must be distributed ahead of time, through secure channels, to each individual who will communicate using this system. Very rapidly this task becomes a formidable obstacle, both in terms of maintaining secrecy and in the economic sense of containing the costs.

Viewing the recent emergence of new cryptosystems that achieve the level of information—theoretically security, all have the common element of introducing a new mechanism for distributing a large random key that is unknown to a potential adversary. This large random key is then used as a one-time pad, thus allowing the system to achieve perfect secrecy. Quantum cryptography for example, uses quantum spin to transfer random information between two users. A potential adversary has a low probability of intercepting all of this information, and users can use this difference in information to build a one-time pad with a very high degree of confidence. A further advantage of this system is that it does not require the prior exchange of a private secret key through a secure channel. Instead, it requires only an authenticated public channel where the two users can assure the identity of the other user.

Other methods for creating and exploiting such information differences have been proposed. One of these methods is disclosed in U.S. Pat. No. 5,161,244, referenced hereafter as "the '244 patent." The '244 patent describes an encryption system that can achieve information—theoretical levels of secrecy by exploiting a difference in information between individual users and an adversary. The '244 patent also teaches how information differences may be created by utilizing the expected errors in a communication channel; two users may exploit the difference information created by this high error rate to achieve perfect secrecy—even against an adversary who has a lower expected error rate than either user. One possible embodiment utilizes a satellite broadcast of low power to create a common source of random numbers with an expected error rate in the broadcast that will differ with each potential receiver. Again, the users do not need to exchange a private secret key to achieve this level of security as long as their public discussion is conducted through an authenticated public channel. In both of the above systems, the use of a (relatively) small private key exchanged via a trusted courier or some other means allows the requirement for an authenticated public channel to be relaxed.

Neither of these systems, however, has been implemented in a commercially viable system. Quantum cryptography has been experimentally demonstrated but, even if some of the technical limitations (range, for example) are overcome, both it and Maurer's proposed system have structural aspects that will drive up the economic cost of implementation. Further, with quantum cryptography, one user must send extensive quantum information directly and exclusively to the other user. This drives up the cost of implementation and limits the capability of the system to achieve economies of scale. Maurer's system, on the other hand, has the advantage of using a common broadcast of random numbers, allowing many users to simultaneously use the exact same broadcast and thus share the cost and achieve better economies of scale. However, Maurer's system still requires extensive and exclusive (one to one) communications between two users. The amount of communication required can be seen from the following: Actual implementation with current technology may require the communication of one megabit between the two users for every one random bit generated for use as the encrypting key (the "one time pad"). Even in this era of plentiful, cheap bandwidth, the ratio is staggering and will not scale well if millions of users attempt to use the system on a regular basis.

Another system has been proposed by Maurer and Christian Cachin, in a published paper on achieving information—theoretically perfect secrecy when an enemy is "memory bounded", titled Maurer and Cachin, "Unconditional Secrecy against Memory-Bounded Adversaries." *Proceedings of Crypto '97* (B. Kaliski, ed.), Lecture Notes in Computer Science, Springer, 1997.) In the paper, Maurer and Chachin propose that such unconditional secrecy could possibly be achieved by using a high bandwidth satellite channel with a low error rate to broadcast a long but limited string of random numbers. When an adversary does not have sufficient memory to record the entire broadcast of random numbers, unconditional security for a message of limited length is possible, subject to certain specific parameters and assumptions.

The Maurer and Cachin proposal possibly resolves some for the drawbacks noted for quantum cryptography and the embodiments of U.S. Pat. No. 5,161,244. More particularly, the common broadcast allows universal access, suggesting that many users could use the same broadcast and thus reduce the cost of implementation. In addition, the larger the gap between the adversary's memory and the broadcast string of random numbers the lower the amount of information that must be transferred between individual users.

The Cachin and Maurer paper, however, proposes a broadcast of random numbers that is limited in duration, and the time of this broadcast may well be known to the adversary. The limited structure of this broadcast clearly reduces the cost of broadcasting the random numbers by reducing the amount of time a satellite or some other high bandwidth communication system must be devoted to the cryptosystem. High bandwidth systems are extremely capital intensive to design and implement, so at first it appears that a limited broadcast represents the least expensive option and therefore has higher potential commercial viability.

The present inventor, however, has identified that the limited nature of the broadcast restricts its practical and economic use to a few users with considerable resources. The first basis for the restriction is that it is relatively expensive to implement a limited broadcast of random numbers because it restricts the number and size of messages and therefore the number of potential users. These few users and small quantity of messages must bear the high fixed costs of the satellite system, resulting in a system with high costs per user or per message. The second basis for the restriction is that any limited broadcast may be overcome by well-funded adversaries who know about the size and timing of the broadcasts. Memory may be re-used, so the adversary may spend a fixed amount of capital on memory (even if the number is quite high) and then amortize this cost over many messages. The third reason is that those users who require the greatest security typically face the best challenges from the most capable adversaries, so these users are less likely to use a limited broadcast. Unfortunately, these same users are also the parties most capable of paying for a high-cost system, so a limited broadcast system becomes even less economical because the market segment most able to pay will be the least likely to use it.

SUMMARY OF THE INVENTION

It is an objective of this invention to provide a system that, against many classes of enemies, will produce secrecy by placing them in a memory bounded condition. In the context of this objective, memory bounded is defined as a condition where the adversary does not have sufficient memory to record all or a very large percentage of the random number broadcast and, for that reason, it does not have complete information about a broadcast of random numbers.

It is a further object to allow low-cost implementation of high-quality security for a great many users, using relatively low amounts of processing power, in a broad variety of circumstances.

It is another objective of the present invention to provide economies of scale to users of the encryption system, and also impose substantial cost burdens even on enemies with considerable resources.

It is a further objective of the present invention to impose a constant stream of costs upon a potential adversary.

It is a further objective of the present invention to utilize the continuous nature of the random broadcast to its fullest possible extent by reducing or eliminating any information a potential adversary may have regarding the time at which the users exchange a private key.

It is a still further objective to conduct error correction, key update, and other public discussions that may be used to form a secure private key in a manner that limits the information an adversary may develop regarding the time at which the users are drawing random bits from the continuous broadcast.

One key aspect of the present invention is that it utilizes a continuous broadcast of random numbers, one that is ongoing in time. In a preferred embodiment, this broadcast will be carried through a global satellite system comprising multiple satellites that enable complete global coverage so that two users may access the same exact broadcast from virtually any geographic location. Another key aspect of the present invention is the use of a random number "reservoir" that is formed from random bits downloaded from the random number broadcast. This reservoir is used to provide the encrypting key that converts the plaintext message into ciphertext. It is an objective that the reservoir is replenished independently of the messages exchanged between users. A feature of this invention is that this reservoir can be used as a buffer, in optional embodiments, which will reduce or eliminate any information a potential adversary may have regarding the time at which the two users sampled the broadcast of random data.

It is an objective of the present invention to utilize the continuous broadcast structure to utilize a new type of uncertainty not utilized in previous proposals for unconditionally secret systems. In the system disclosed here, the continuous broadcast enables the time of the user's key exchange to become an inherent part of the private key itself. An adversary of two users in a continuous broadcast system who has no information regarding the time of the private key exchange will face a condition of either greater uncertainty or greater costs for additional memory. Even extraordinarily well funded adversaries must contemplate identifying the time of the private key exchange in order to increase the probability of obtaining useful information about the users' encrypting keys, or reducing their memory and search costs. This suggests that an adversary must have interception capabilities not contemplated by Maurer, Claude Shannon, or most practitioners of the current art. More specifically, the adversary must be able to identify when a private key exchange took place; this requires observation or interception capabilities not normally assumed in the design of cryptosystems.

In addition, the present invention teaches that continuous operation and a random number reservoir are not just improvements in encryption capability, but are economic improvements as well, making the system accessible and usable by a much larger body of users. Any users, irrespective of their geographic locations, may draw from the random broadcast anytime, anywhere. This allows more users to share in the cost of the system, thus allowing users—rather than just well-funded adversaries to achieve economies of scale and amortize high costs across a very large number of messages. This is a substantial advance over the current art.

Finally, the present invention imposes steadily rising storage costs on a potential enemy. As time passes, the present invention gains strength and reduces costs for users, while an enemy faces continually rising challenges on its resources. Such an advance generates a powerful advantage in the art of cryptography.

BRIEF DESCRIPTION OF THE DRAWINGS

The foregoing and other objects, aspects, and advantages will be better understood from the following description of preferred embodiments of the invention with reference to the drawings, in which.

DETAILED DESCRIPTION OF THE INVENTION

Definitions of Terms

Figure 1:
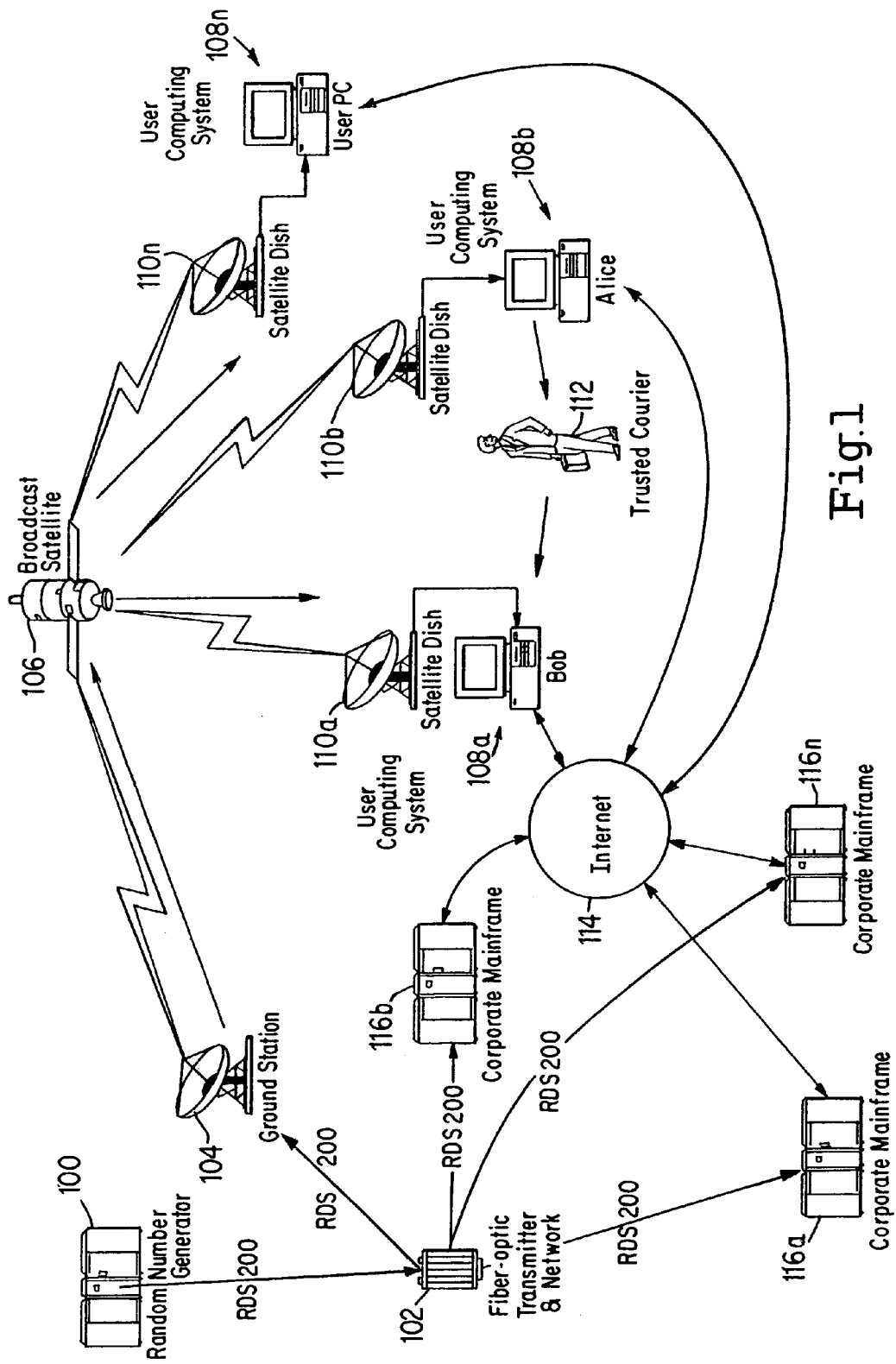
FIG. 1 is a system diagram of an example embodiment according to the present invention.

The following definitions govern this description, unless otherwise clear from the specific context in which the terms are used, or where a different or additional definition is stated:

Ciphertext, C:

Ciphertext is a standard term of art referring to the plaintext after it has been encrypted to form the ciphertext.

Encrypting Key, E

The encrypting key E represents a block or string of random bits drawn from the reservoir RNR that are XORed with the plaintext to form the ciphertext. For perfect secrecy, there must be a unique corresponding bit drawn from the RNR for every bit in the plaintext of the message.

Private Key, k:

The private key k contains n number of bits. The key k is a secure private key that is exchanged between any two or more individuals. The private key k is usually exchanged via a "trusted courier" or through a secret channel so that no information about the value of the key is revealed to a potential adversary. A separate k must be exchanged between each set of individuals who wish to conduct secret communications. The private key k must be sufficiently large to "point" to all the possible bits that will be broadcast during a time, t. As described, a long k may be broken into several sub keys that point to different bits within the same time t. These sub keys could significantly increase the security of the encryption system. One consideration is that a very high speed random number broadcast operating at 1 gigabit a second will generate approximately 255 bits in a year, so a key of 55 bits is sufficient to uniquely point to a single bit in a year's broadcast. A longer k of 110 bits could be used to uniquely identify two bits within that same year. Alternatively, three sub keys of 36 bits could be used to identify 3 bits within a shorter span of time, and so on.

In the current art, the secrecy of a private key is assumed to cover only the content: that is, the enemy does not know the value of the specific bits in the key. In the present invention, it is highly advantageous if the time of the transfer of this private key is also secret. In an ideal embodiment, a potential adversary will have zero information on the time of any private secret keys exchanged between two users.

In the current art of public and private keys systems, such information is either predetermined, assumed to be known by the enemy, or not relevant. But it is a significant advantage of the present invention that this time may become a vital inherent part of the key itself, and may add a very considerable amount of uncertainty to an adversary's attack without any additional processing, expenditure, or resources consumed on the part of the users of this system. This represents a considerable advantage over the present art.

Random Data Stream (RDS)

The continuous stream of random bits to be received by the parties using the present invention to encrypt their communications.

Sample ($SMP_1$, $SMP_2$, $SMP_3$, . . . $SMP_x$); size in bits (s)

A series of blocks (or strings) of random bits downloaded or "sampled" from the RDS. The timing of these samples is derived by algorithm(s) z from the private key k. The number of bits in SMP is denoted by s. The number s may be predetermined and assumed known by an enemy or derived from the private key, k, and unknown by the enemy.

Random Number Reservoir ($RNR_1$, $RNR_2$, $RNR_3$, $RNR_4$, . . . $R_i$)

The RNR is a file of r bits or set of files on the storage device of the users' computers, as described further below. Each RNR contains a series of the samples ($SMP_j$) defined above, which are selected by algorithm z over time from the RDS. A separate RNR, is required for each contact with whom the user wishes to communicate in secrecy. For example, if Alice wishes to communicate in private with Bob and Charlie, but individually, so that neither Bob nor Charlie can read Alice's messages to the other, then Alice must maintain two reservoirs, one for Bob and one for Charlie. A third reservoir would be required to provide encryption for common communications between all three.

This is part of the traditional key management problem typically associated with private key systems. The present invention reduces this problem's significance through reservoir replenishment, which allows for smaller reservoirs. In an ideal embodiment, an adversary will have zero information about the time at which this reservoir is replenished.

In order to achieve perfect secrecy, a potential adversary must have either zero information or an arbitrarily low probability of having any information on the contents of the RNR. In a preferred embodiment, the users will have undertaken processes and methods that have reduced or eliminated any information a potential adversary may have had regarding the time at which the SMPs were drawn from the RDS. Those skilled in the art will appreciate that the reservoir may be constructed in many ways from an s string of randomly drawn SMPs. In preferred embodiments, these SMPs will be integrated into the reservoir (XORed or added modulo 2) successively so that at any point in time the bits in the reservoir represent a summation of all previous SMPs. In other words, the state of the bits in the reservoir will, in preferred embodiments, always be influenced by the states of all previous inputs.

The encrypting keys, E, will be drawn from the RNR.

The initial size, in bits, of the RNR is r. This r may be predetermined in a public discussion accessible by a potential adversary, or derived from k.

Plaintext (P)

The term "plaintext", referenced herein as "P", is standard term of art. In the present disclosure, the term is generally used to describe a message at a specific point in the encryption process: when the message has been converted from the natural language by some coding mechanism to a string of bits that will be encrypted.

Selection Algorithm (z)

Selection algorithm (z) represents an algorithm or set of algorithms designed to take the private key k and generate a set of instructions for the operation of the encrypting process. One of the key variables is time t.

Time (t)

The time at which the user's computing device will collect a sample SMP from the RDS for storage in the RNR.

Trusted Intermediary or Trusted Agent

An individual with whom a user has exchanged a private key in the past and now maintains a current, synchronized RNR so that the user and the trusted agent may conduct secret communications.

FIRST EXAMPLE SYSTEM EMBODIMENT

Figure 2:
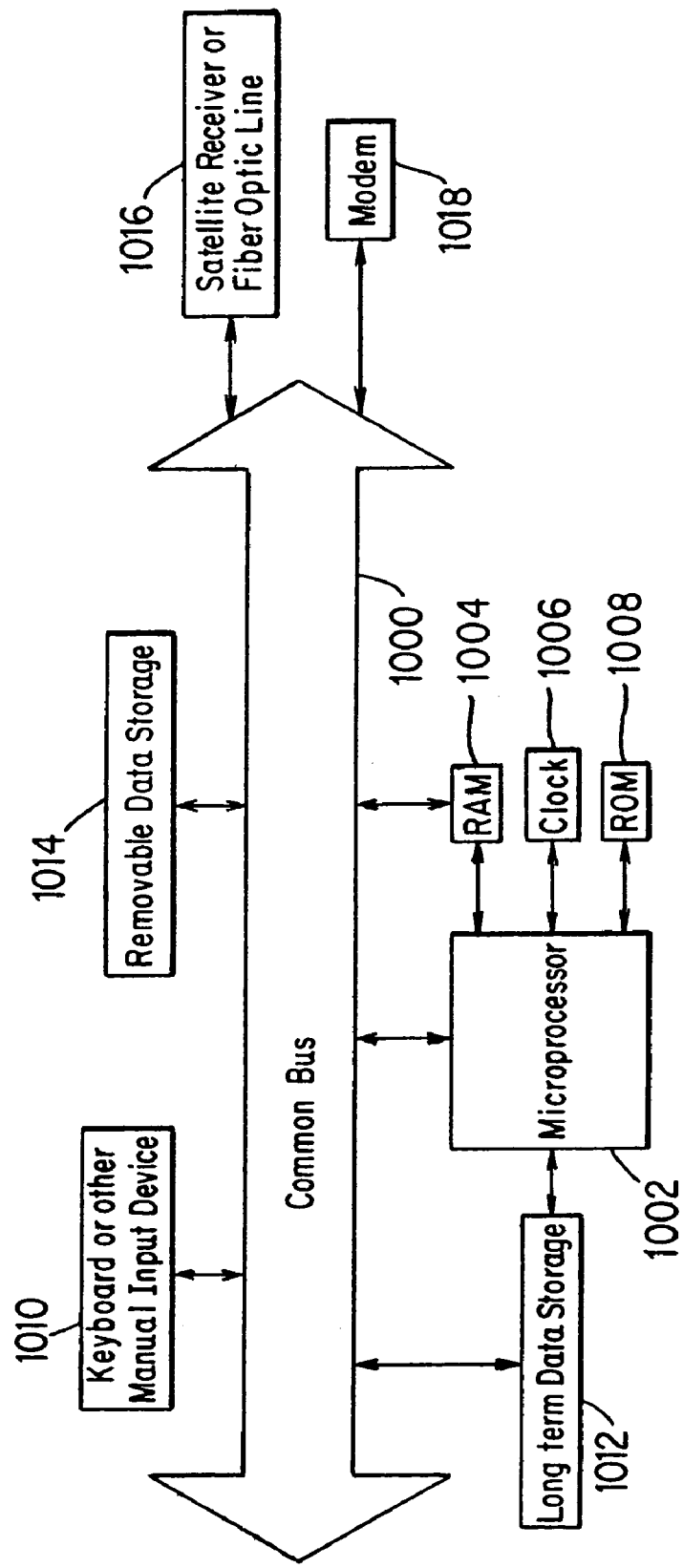
FIG. 2 is a hardware architectural block diagram of a typical example individual user's computing system within the system of FIG. 1.
Figure 3:
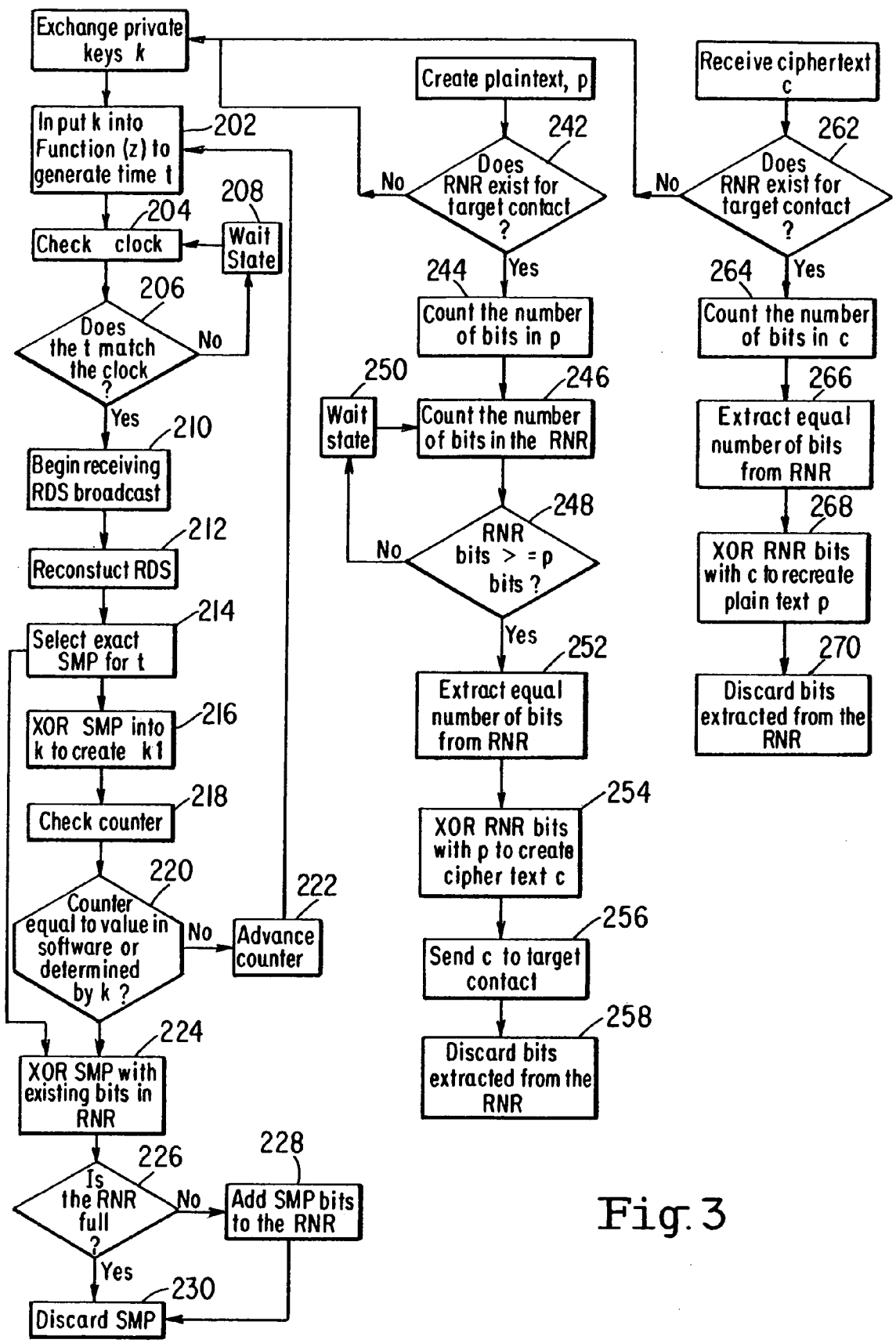
FIG. 3 is a flow chart showing an example general method according to the present invention.

Referring to FIGS. 1 and 2, a first example embodiment of a system of this invention will be described. FIG. 1 shows an example high level system architecture, with FIG. 2 showing a more detailed architecture of typical example of the FIG. 1 User Computing System 108n. FIG. 3 described is an example a general encryption method of this invention performed, for example, by the system of FIGS. 1 and 2.

As will be clearly seen by one of ordinary skill in the art upon reading the present disclosure, the particular architecture and related hardware selection and arrangement depicted by FIG. 1 is for purposes of example only and is by no means limitative. The gist and novelty of this invention does not exist in the specific selection of hardware and arrangement thereof depicted by FIG. 1. Other example system architectures, combining and/or omitting hardware shown in FIG. 1, or using substitute methods of performing functions within the system, are contemplated.

The example system architecture of FIG. 1 comprises a Random Number Generator 100 which generates a Random Number Sequence RNS that is transmitted to a Broadcast System 102. The Broadcast System 102 for the basic embodiment of FIG. 1 distributes, or broadcasts, the RNS to the Ground Station 104 and to a plurality of User Computing Systems 108n and to a plurality of corporate mainframe computers 116n. The basic example embodiment of FIG. 1 depicts three User Computing Systems, labeled as 108a, 108b, and 108n. The units 108a and 108b are particular ones of the units 106n used for purposes of describing example methods of this invention and are referenced herein as the First User Computing System and the Second User Computing System, respectively.

The Random Number Generator 100 is preferably a true random number source derived, for example, from a natural source such as radioactive decay or background radiation noise, generates a continuous stream of random numbers (random bits) that is unpredictable and uniformly distributed. As known to those skilled in the art, the higher the rate of this stream of random numbers, the more advantageous the versatility, security, and cost benefits of entire cryptosystem. Rates of several gigabytes per second or greater are contemplated. As stated, the output of the Random Number Generator 100 is a random data stream, referenced hereinafter as RDS.

The distribution of the RDS to the User Computing Systems 108n is shown in FIG. 1 as being via downlink from the Broadcast Satellite 106. Pursuant to this depicted RDS distribution the Broadcast System 102 transmits the RDS to a Ground Station 104 which uplinks to the Broadcast Satellite 106. As can be seen, the embodiment of FIG. 1 is preferred for many applications as Ground Station 104 delivers the RDS to the Broadcast Satellite 106 so that the satellites function as "bent pipes," receiving the RDS from the ground station and retransmitting it across a wide geographical area. This method offers several advantages: less equipment in orbit, access to 100 for repair purposes, and simpler methods to transfer the RDS to multiple satellites.

The Broadcast System 102 will continuously broadcast the RDS. This Broadcast System 102 must be capable of delivering very high data rates with very low error probabilities. In addition, the Broadcast System 102 must have sufficient coverage through, for example the Ground Station 104 and Broadcast Satellite 106, so that any two users, e.g., the First Computing System 108a and the Second User Computing System 108b, will receive the broadcast RDS.

The medium by which the Broadcast System 102 transmits the RDS to destinations such as, for example, the Ground Station 104 and User Computing Systems 108n, may be wireless radio, satellite, or high capacity wireline, such as coaxial cable or fiber optic line. FIG. 1 shows each User Computing System connected to the Broadcast System by way of satellite receiving dish 110 and via the Internet 114.

The chief drawback of a wire or fiber-based broadcast system is that its reach is not ubiquitous. Where mobility is not an issue, and where access to the lines is assured for both parties, then a fiber optic line will have substantial advantages because of its extraordinary capacity.

This disclosure primarily describes an embodiment using a high capacity satellite system such as the Ground Station 104 and Broadcast Satellite 106 of FIG. 1. However, this described example is not intended to limit the scope of the present invention to satellite broadcast systems. In addition, FIG. 1 shows a single Broadcast Satellite 106. In practice a satellite broadcast system may contain one or more satellites in different-orbits, and in a preferred embodiment will have a sufficient number of satellites to achieve global coverage. In military embodiments, additional satellites may be used to counteract jamming by an enemy, a known practice utilized by the Global Positioning System (GPS).

Each of the example User Computer Systems 108n includes a Satellite Receiving Dish 110n. A Trusted Courier or Secret Channel 112, represented in FIG. 1 as a human form, transports information to or between User Computing Systems 108n, including the First User Computing System 108a and the Second User Computing System 108b, as will be described below. The Trusted Courier or Secret Channel 112 is a means by which two individual uses are able to exchange a private key. In addition to the content of key itself remaining private, in a preferred embodiment, the method and timing of the key delivery will also be secret.

As stated previously, the particular architecture and related hardware selection and arrangement depicted by FIG. 1 is only to facilitate a description of the invention and is for purposes of example only. Many variations in arrangements of the hardware, and the site where functions are performed are contemplated by this invention. For example, random number source 100 may be incorporated directly into the same satellite 106 used to broadcast the RDS, but this may be advantageous only for single satellite embodiments. Further, error correction and synchronization bits or schemes may be included in the generated RDS. More particularly:

Error Correction

Additional bits or "packets" (blocks of bits) inserted into the RDS for the purposes of error correction and synchronization. Such "deterministic" or predictable bits will reduce the overall rate of random bits, but in most embodiments their addition will be advantageous to end users. Error correction codes are well known in the art of information theory and communications.

Synchronization

Synchronization techniques are also well known. In this system, as data rates increase, the accuracy of synchronization between two remote and unconnected individuals must also increase. Inserting synchronization bits directly into the RDS allows less accurate and less expensive clocks in user devices.

FIG. 2 shows a hardware architecture of a typical example User Computing System 108n within the FIG. 1 system. The FIG. 2 example architecture comprises a common bus 1000, a microprocessor 1002 connected to the common bus, a random access memory RAM 1004, clock 1006 and read only memory ROM 1008 connected to the processor. Also connected to the common bus 1000 is a keyboard or other input device 1010, and a long term data storage 1012, and a removable data storage 1014, such as a CD ROM, ZIP drive or the like. The FIG. 2 example User Computing System 108n further comprises a satellite receiver or fiber optic line 1016 and a modem 1018. In the FIG. 1 example the satellite receiver or fiberoptic line 1016 would be a satellite receiver connecting to the depicted satellite dish 110n associated with each User Computing System 106n. The modem 1018 of the FIG. 2 example User Computing System 106n connects, in the example system of FIG. 1, to the Internet 114.

It is an advantage of the present invention that many devices of varying processing capability may be used. Therefore, although a typical embodiment is represented by a conventional personal computer with a satellite downlink receiver, 108n is better defined by its function than by its specific hardware. For the purposes of brevity the computers for encryption or decryption may be conventional personal computers and are identified as an encryption station and decryption station respectively. In view of this, the general requirements of the User Computing System 108n are enumerated as (a) through (f) as follows:

a. Means for Receiving the Private Key and Other Data Input:

The User Computing System 108n must be able to receive input of a key k of varying length. Typically the input will come from a keyboard, such as item 1010 of the FIG. 2 example, or from a mobile storage medium such as a floppy disk or CD, such as item 1014 of FIG. 2.

b. Means for Receiving and Processing Recovered RDS Bits Output from Satellite Receiver/Modem:

The User Computing System 108n must have a microprocessor able to receive and perform calculations utilizing data supplied by the RDS.

c. Means for Data Computing and Processing:

The example User Computing System of FIG. 2 has a microprocessor 1002. Regarding performance requirements, it is an objective and advantage of the present invention to require little processing power so that a wide range of processors may be used. Therefore, general microprocessors found in most present day personal computers, such as, for example, the Pentium™ II, Pentium™ III, or PowerPC™ chip, as well as microprocessors found in many other digital devices, such as a Palm Pilot™, will typically have sufficient processing power for most embodiments of the present invention.

d. Data Storage Device and Storage Medium:

The User Computing System 108n must have the capability to store segments of the RDS data. The means for such storage covers a wide number of potential devices, including hard drives, floppy drives, "Zip" drives, flash memory, tape systems and optical drives such as CD or DVD systems. Most hard drives in PCs or non-volatile storage in mobile devices will be sufficient. Storage requirements for the present invention will be correlated with the total size in bits of the messages communicated by the individual user per unit of time. In general, frequent communications will require more capacity while occasional communications will require less. Users whose computing systems are in an insecure area may prefer a removable medium, such as a floppy disk or recordable CD The example User Computing System 108n of FIG. 2 has a long term data storage 1012, and a removable data storage 1014 which serve this function.

e. Clock: (optional for some embodiments)

Clocks, such as the clock 1006 of FIG. 2, may be used to synchronize the operation of individual users. As will be understood from this description, individuals using this invention's encryption system to communicate must be synchronized so that they are both receiving and downloading the RDS broadcasts at the same time, thus acquiring the same string of random numbers. The synchronization process need not be kept secret, but it must have no correlation whatsoever to the encryption time or procedures. Highly accurate internal clocks are preferred; those found in conventional commercially available personal computing devices will likely be sufficiently accurate for most embodiments. It is an objective to use such systems without modification, so the inclusion of synchronization bits in the RDS will be advantageous.

f. Satellite Receiver, Modem or Other Landline Receiver:

The User Computing System 108n must, for this general embodiment, be capable of receiving the RDS broadcasts from the Broadcast Satellite 106 or Internet 114, and downloading the RDS to the computing resources of the User Computing System 108n. An embodiment utilizing a satellite broadcast system will utilize an antenna or dish, such as the antenna 110n of FIG. 1, optimized for the satellite and frequency. Receivers for wireline systems will be modems, such as the modem 1018 of FIG. 2, capable of translating the broadcast methods back into a stream of random bits.

FIRST EXAMPLE METHOD OF THE INVENTION

Referring to FIGS. 1–3, an example of the present inventive method and an example system for performing the same will now be described. The block flow diagram of FIG. 3 is for purposes of describing, to one of ordinary skill, this invention and its operation. Actual implementations of this invention which are covered by the appended claims may omit one or more steps of FIG. 3, or may combine two or more method steps depicted in the figure as separate into a single step, or perform the steps in an order different from that which is depicted.

The method of the present invention, as described in reference to the example of FIG. 3, consists of three related sub-processes. The first is the local generation and maintenance at each of the First User Computer 108a and Second User Computer 108b of Random Number Reservoir RNR for encryption and decryption of data. Steps 200 through 230 depict an example embodiment of this process. FIG. 2 steps 240 through 258 depict an example creation of plaintext and encryption of the plaintext using the RNR generated and maintained at a sender's computer, such as the First User Computer 108a, by that computer carrying out steps 200 through 230. FIG. 2 steps 260 through 270 depict an example reception and decryption at a receiving party's computer, such as the Second User Computer 108b, of the encrypted data generated by steps 240 through 258. The extracted bits from the RNR used for encryption and decryption are identical. Therefore, for purposes of this description, it is assumed that the RNR generation process of steps 200 through 230 are performed identically as between the First User Computer 108a and the Second User Computer 108b. Accordingly, for ease of description, the First User Computer 108a and the Second User Computer 108b are referenced as User Computing Device 108 when both 108a and 108b, for the particular, are performing the same steps locally. Similarly, the First Satellite Dish 106a shown in FIG. 1 as connected to the First User Computer 108a, and the Second Satellite Dish 106b shown as connected to the Second User Computer 108b are referenced collectively as Satellite Dish 106.

Steps 200 through 230 of the example method of FIG. 2 are performed while a continuous stream of random numbers, represented as bits in this present disclosure), the RDS is generated by a true random number source 100 at extremely high data rates.

In a preferred embodiment, the RDS is continuously broadcast (24 hrs/day) over a wide geographical area on a predetermined frequency using a communication system such as the Ground Station 104 and Broadcast Satellite 106 of FIG. 1, preferably with an extremely low error rate. Those skilled in the art will appreciate that this "continuous" broadcast may not need to operate 24 hours a day to achieve many of the same benefits disclosed here. For example, the broadcast may take place for a limited number of hours, perhaps during periods of time when demand for bandwidth is low, thus reducing costs. This limited broadcast of random numbers may take place on a periodic basis, and so, over the course of time, will also form a very large stream of random numbers, the RDS.

Also, in a preferred embodiment, the commencement of this RDS broadcast will be unknown to any potential adversary. Although the broadcast itself will clearly form a public revelation of its own existence, in a preferred embodiment a potential adversary will not become aware of the broadcast until after it has started. Further, it will be even more advantageous if the users were aware of this broadcast before their potential adversary. These are not necessary or limiting conditions, but merely extra potential advantages for potential users that may be utilized to increase their potential security against a memory bounded adversary.

Referring to FIG. 2, the method will be described by an example communication between two users, Alice and Bob. Alice uses the First User Computer 108a and Bob uses the Second User Computer 108b. For this example both Alice and Bob receive the same RDS broadcast, and both have the same operating software.

A. Private Key Exchange and RNR Generation

Referring to FIG. 2, first at step 200 Alice sends Bob a private key, k. A usual method is via a trusted courier. In a strongly preferred embodiment, the time of the key exchange itself is secret so that potential adversaries have zero knowledge about the time of the key exchange. If the time of the key exchange remains secret, the users of this system will have imposed either additional cost or uncertainty, or both upon a potential adversary. Such extra uncertainty represents an advance over the prior art, as it may force an adversary to perform work before two users have even decided to conduct secret communications with this system.

Next, at Step 202, both Alice and Bob input the Private Key k, either through the keyboard, some other manual input device, or a removable storage medium such as a floppy disk. In response, Algorithm z, which is public knowledge and is common to Bob and Alice, will transform k into a set of parameters and instructions that will control the operation of the encryption process. Upon reading the present disclosure Algorithm z can be readily written by one of ordinary skill in the art.

The most crucial variable that k (or a sub key) and z will determine is the time t when the First User Computer 108*a* and Second User Computer 108*b*, referenced collectively as User Computer 108, will sample the RDS. That sampling is described below in reference to other steps of FIG. 2. This time t is determined by k and z and stored in non-volatile memory so that its value will be retained. This determination of t is as follows: Periodically, at a cycle time determined by the check clock operation of step 204, the User Computer 108 (First User Computer 108*a* and/or Second User Computer 108*b*) will compare, at step 206, the value of t with the current time in the clock. When the difference in the values is sufficiently small, the process goes to step 210, wherein the microprocessor (not shown) in the User Computer 108 begins receiving and analyzing the RDS, through an interface (not shown) between it and its Receiving Dish 106. The interface (not shown) includes radio signal receiver, down-converter and Analog to Digital Converter, and such devices are well known in the art.

Next, at step 212 the User Computer 108 reconstructs the RDS from the sampled data. If synchronization bits are included in the RDS, step 212 includes a microprocessor step (not numbered) of seeking to match the values from the synchronization bits in the RDS to the value of t.

As shown by step 214, at time t the User Computer 108, via its Receiving Dish 106 and interface will "sample" the RDS broadcast for a limited amount of time to create a block of random bits, SMP. As those skilled in the art will appreciate, it may be advantageous for the system to begin downloading the RDS to a temporary file before time t in order to insure that the entire sample starting at time t is recorded. The extra bits preceding t may be discarded to create the SMP.

The timing of FIG. 2 steps 204 through 214 is independent of the start and stop times of the data packets (not shown), if used, of the received bit stream from which the RDS is recovered. More particularly, although the broadcast system, e.g., the Broadcast System 102, Ground Station 104 and Broadcast Satellite 106, may transmit the RDS in the form of data packets, or blocks of bits, for error correction purposes, the formation of the packets will not affect how the SMPs are started and formed. The packets should be a communications vehicle only; the packet structure should not affect the process for identifying time t and the formation of the SMPs for the RNR. If the broadcast system does indeed break the RDS into a series of packets, these packets should be regarded simply as temporary groupings designed to facilitate transport. After receipt of the broadcast, the various packets should be aligned together sequentially in time to reform the original RDS for that period of time. The SMPs are then derived from the reconstituted continuous RDS.

Referring to FIG. 2, step 214 finishes, for this example, by downloading the SMP to the appropriate Random Number Reservoir RNR in the storage of the User Computer 108. The term "appropriate" is used because it is contemplated that the User Computer 108 can maintain a plurality of Random Number Reservoirs, RNR, each associated with a particular party in communication and its particular private key k.

Next, the process goes to step 224 where the arriving SMP may be XORed with all of the current bits that form the string of random bits already in the RNR to create an entirely new RNR. Such an XOR operation will require little processing power, but will add substantially to the security of the overall system by making it difficult for even an unbounded memory adversary to derive the underlying RNR. Those skilled in the art will appreciate that there are variety of methods for XORing or integrating the recent SMP into the RNR, with varying degrees of protection created by each potential method. Such persons skilled in the art will also note that creating dependence on the previous state of the RNR for the future values of the RNR, while an enhancement to security, creates the risk of error propagation. It also requires processing time, although, it is important to note, the processing may precede the actual encryption operation so that the time required to actually encrypt the plaintext is the same basic XOR operation.

Although not depicted in FIG. 2, the SMP may be stored in a temporary file (not shown) before it is integrated into the RNR that will eventually serve as the private encryption/decryption key. This temporary file will serve as a buffer, and packets of various sizes may be derived from this temporary file for the purposes of error checking. Those skilled in the art will recognize how bit error checking procedures may be applied through an authenticated public channel; some bits will need to be discarded in order to reduce information leaked to a potential adversary. It is also possible that bits from the final RNR may also serve to authenticate the error checking procedure so that the requirement for an authenticated public channel may be relaxed. In an ideal embodiment, the packets being checked for error will have no correlation in time with their download from the RDS, or with the order in which they were received.

Referring to the example of FIG. 2, at step 224 the recovered SMP is XORed with the existing bits in RNR. Next, step 226 checks if the RNR if full. If step 226 determines that the number of the RNR isn't full the SMP is not discarded but its bits are now added, at step 228, to the RNR so that the total number of bits in the RNR is increased. For the depicted example, if the RNR is full the SMP is discarded at step 230.

This process may be repeated at random intervals until the RNR is completed. After it is "full," the system can either continue to create new SMPs and XOR these through RNR, or in an alternative embodiment, the SMP may be discarded without being integrated into the RNR. New SMPs are created by steps 216, 218, 220, and 222, described below. In any of these embodiments, it is crucial that the depletion of the RNR through use will not trigger the system to replenish the RNR. The trigger to add bits to the RNR must be statistically independent from the use of the RNR, or a capable adversary may be able to begin to guess when the system is sampling the RDS (e.g. right after an encrypted message is sent.)

Referring to FIG. 2, if the system continues to create new SMPs the process is as follow: First, at step 216 the previous SMP is XORed into k to create $k_1$. Step 218 checks a counter (not shown) and step 220 compares the counter value to a predetermined value set in software to a value determined b k. If the comparison has a "No" value the process goes to step 222, advances the counter, returns to step 202, puts the new $k_1$ into the Function (z) to generate a new sample time t, and repeats the process described above to obtain another SMP.

There are a vast number of ways that the new SMP may be merged with the old key, but the point of the exercise is to add new random bits to k. This new $k_2$ is run through z again to create a new time $t_1$ and another SMP for the RNR, as described above.

Those skilled in the art will appreciate that this entire process may be repeated for each sub key, (if the original key k was broken into sub keys) so that a two dimensional array is formed, where each sub key creates its own RNR (or string of random numbers). These RNRs may be added together modulo 2 (XOR) to form a new string of random numbers. This latter method of utilizing sub keys would allow a user to increase security while holding t constant; it does, however, increase the size of the private key k that must be exchanged.

Referring to FIG. 2, it is seen that by carrying out steps 200 through 230 on their respective computers 108*a* and 108*b* Alice and Bob have used the private key k and the commonly received RDS to create the exact same RNR. Both computers 108*a* and 108*b* are synchronized in time, so they have sampled the RDS broadcast at the exact same instant, for exactly the same amount of time, and acquired the exact same random bits SMP when each performs step 214.

The reception of the RDS is passive, so an enemy will have no idea when Alice and Bob are sampling the RDS. Where the volume of bits broadcast through the RDS is very high, it is likely that an adversary will become memory-bounded—unable to record the entire RDS. Over time it will be unlikely that even a well-funded adversary will have in memory a record of the RDS that contains useful information on what Bob and Alice have used for their RNR.

B. Encrypting a Message.

Referring further to FIG. 2, encrypting a message is straightforward. Assuming that Alice is encrypting and sending a message for the First User Computer 108*a*, the first step at that computer is step 240 of creating the plaintext P. Next, at step 242 the First User Computer 108*a* determines if it has an RNR for transmitting messages to the particular Second User Computer 108*b*. If it does not then it returns to the above-described step 200, exchanges keys with Bob and, by steps 202 through 230, generates the required RNR. If the answer at step 242 is "Yes" the First User Computer 108*a* executes steps 244 through 248 to determine whether or not it has sufficient bits in its Random Number Reservoir RNR to encrypt the message P. Basically, to encrypt the plaintext message P, the number of bits in the RNR must be greater than or equal to the number of bits in P. If step 248 of the sending computer, i.e., Alice's First User Computer 108*a*, determines that there are not enough bits in RNR then the process goes to step 250 and waits while steps 202 through 230 add to that computer's RNR. Once a sufficient number of random bits are in the RNR (equal to the number of bits in the plaintext message) the process goes to step 252 described below. If step 248 determines that there enough bits in the RNR then the process goes to step 252 and extracts from the RNR the same number of bits as there are in P. Next, at step 254 the extracted bits from the RNR are XORed with the plaintext message P in a one-to-one correspondence or ratio to create a ciphertext C. Then, at step 256, the ciphertext C is sent to the target contact, which, in this example, is Bob on the Second User Computer 108*b*. The extracted bits from the RNR are then discarded, as shown by step 258. It must be noted, in reference to step 254, that each bit in the plaintext P must be XORed with a unique bit from RNR.

In addition, although not depicted in FIG. 2, additional random bits from the RNR may be tacked into the message to further hinder a potential adversary.

C. Decrypting a Message

Referring to FIG. 2, Bob decrypts the received message C at the Second User Computer 106*b* by performing basically the same steps described for Alice at the First User Computer 108*a*. First, at step 260 Bob (on the Second User Computer 108*b*) receives the ciphertext C. Next, at step 262 Bob's computer determines whether it has the appropriate RNR for decrypting a message from Alice. This is similar to step 242 performed by Alice's computer 108*a*. If the answer is "No" then Bob's computer goes to step 200 to obtain the required RNR. If the answer is "Yes" then Bob's computer 108*b* at step 264 determines the length of the encrypted message C and then, at step 266, removes the exact same number of random bits from his reservoir RNR. Because Alice and Bob have synchronized random number reservoirs RNR, Bob's random bits are exactly the same random bits that Alice used to encrypt the message. Then, at step 268 Bob decrypts by XORing this string of random bits with the encrypted message C to reveal the original message P. Finally, at step 270 the bits extracted from Bob's RNR for performing the step 268 decryption are discarded.

Creation of an RNR Through Public Discussion

Those skilled in the art will readily appreciate that this system may be used to apply lessons from quantum cryptography and other information—theoretically secure systems to create an RNR exclusively through a public discussion over an authenticated channel. Briefly, the two users Alice and Bob agree that they want to form a private key through a public discussion. They may publicly agree on the perceived quantity of memory possessed by their potential adversaries. In a preferred embodiment, this will be sufficient as the rest of the parameters should be standardized and thus will not require further discussion. Although a potential adversary will clearly have precise information about when the two users have started to form a mutual RNR, the continuous RDS broadcast still offers considerable advantages in that it can create a condition where an adversary must continually add memory resources or face a decreasing probability of being able to gain useful information from Alice and Bob's public discussions.

In a general form, both Alice and Bob will sample the RDS at random intervals, and will record both the time of the sample and the value of the bit(s) at that time. Eventually, after a minimum amount of time determined by their mutual agreement regarding the probable size of an adversary's memory, Alice will begin to send Bob through an authenticated public channel the times at which she sampled the RDS. In a preferred embodiment, this public discussion will take place continuously over time rather than all at once. In addition, it may be advantageous in some instances if the times that Alice selects and sends will be selected at random and will not be in sequential order. The objective is to force an adversary into a condition where it must continue to add memory capacity or face a decreasing probability of obtaining useful information.

Alternatively, Alice and Bob may agree to randomly select and record a string of n bits. Alice selects n-x bits from this string and sends this information to Bob through the authenticated public channel. The n-x bits substitute as the index marker, taking the place of the time as an index. If n-x is sufficiently large, there should be little probability of a collision, and there should be a unique n-x with a high probability. Bob searches his stored values for the specific sequence of bits represented by n-x. Once found, Bob signals confirmation to Alice and both discard n-x and retain x for use in building the RNR. In both processes, subsequent actions to check for errors and apply privacy amplification where necessary are well known in the art.

FURTHER FEATURES AND EMBODIMENTS

The purpose of the following disclosure is not to limit the scope of the present invention but rather to clarify understanding and illuminate the versatility of the present invention. Future embodiments may utilize any of the following additional methods, or some combination. The scope of the patent extends to virtually any algorithm operating within the framework of the above methods, where a continuous RDS and reservoir are used to form encrypting keys.

Private Key Length Variability

The private key k may be variable in size. Public and private key encryption systems in the present art generally utilize keys that have a precisely known number of bits. This allows the software and hardware to be custom-designed in order to increase the speed of the encrypting process and provide a solid means for ascertaining the potential work that must be performed by the enemy.

This present invention does not need to utilize a standard or universal sized key to achieve high-speed encryption. Indeed, there may be, in certain circumstances, advantages to using variable sized keys. If the enemy faces a situation where a longer key is probable, smaller keys may be exchanged and used to create perfect secrecy for messages longer than k. This uncertainty must be used carefully—the probability distribution for the key size must be skewed strongly towards the longer keys—so that each key within the total set of possible keys is equally probable.

Key Transfer

In ideal embodiments, the time and method of the private key transfer will also be secret. This will add substantial secrecy, even against highly capable enemies with unbounded memory. In order to counter this advance, an enemy must develop new capabilities not contemplated by Shannon, Maurer or others in the current art. Even an unbounded-memory enemy must observe or gain knowledge of the timing of the private key transfer or it will likely confront a system that is unbreakable in practice (though not in theory except under very limited conditions.)

Private key k Transfer

In a simple embodiment, k may be generated by a continuously broadcast radio signal that is received by both users, Bob and Alice, but is undetected, or not recognized by the enemy. The termination of the signal or a particularly long pause identifies the common start time that will serve as k. Thus k could be as short as a single bit.

Synchronization of Clocks

Many synchronization methods are contemplated; these are three examples known in the current art:

Synchronization Method One

Individual users synchronize clocks or operations by connecting to each other directly or by exchanging data over the Internet.

Synchronization Method Two

Each user periodically synchronizes with a well-known and commonly accessible time-keeping source such as the U.S. Naval Observatory. Connect via the Internet or by receiving wireless broadcasts; both methods are well known.

Synchronization Method Three

Synchronize using data from the RDS. The process will be reasonably obvious to those skilled in the art.

Additional Error Correction Procedures

It is critical that the RDS broadcasts have an extremely low error rate if the users contemplate utilizing some of the feedback mechanisms outlined above for creating new ks and more secure RNRs. With a high data rate, and low error probabilities, the probability that any set of individual users will receive different versions of the RDS will be low. Clearly, the consequences of errors will be more significant and destructive in the case of feeding the SMP back into k to create a new k. With high data rates, this will likely create a situation where Bob and Alice possess different ks, and their resulting SMPs will not be synchronized.

One method for solving this problem without leaking at least some information to a capable adversary is to exchange a new private key. Other techniques may utilize public discussion; hold some private key in reserve for purposes of authentication and error correction. In addition, the system may discuss error correction problems in public, with authentication, without substantially giving away information to potential adversary.

If either the sending or receiving system loses the RDS, or obtains the RDS and finds an error rate higher than the level indicated by agreement between the parties or embedded in software, the individual user's system will record the amount of time that the RDS was unavailable. The user will immediately broadcast or post the times to all users with whom the user exchanges encrypted communications that the RDS was not received. A public posting, such as on a Web site, would indicate only when the user did not receive the RDS, and would not reveal which specific reservoirs were affected, thus preventing a potential adversary from drawing information on when the user's system was attempting to download samples for a specific reservoir. In an alternative embodiment, the system could determine which reservoirs were affected by this broadcast outage and may send encrypted error—alert warnings to the appropriate parties. But, in general, the system should not calculate which individual users were affected, and which were not, and then send the information only to those who were affected.

This identification of problem times will allow sets of users to suspend their RDS sampling, or perhaps reconstruct an error—propagated RNR. The other users will discard the data obtained during the time that the RDS was unavailable to the other user. Depending on the algorithms used to construct the reservoir, recalculation of the reservoir may be required to resynchronize.

Where a high probability of errors is expected, random data may be held in a separate cache before being added to the official random number reservoir. Alternatively, this cache may hold the numbers inserted into the reservoir. This cache will be triggered for release or cleared after the two users have synchronized their systems again. This process may be automatic.

Still further, a "Spare private keys k" may be held in reserve for use when error propagation requires the RNR to be reset. These types of reserves must be used carefully, and only when the identity of the other party can be verified. Otherwise the system will be vulnerable to adversaries masquerading as friends who intentionally trigger a diversion into the error subroutine. Such an adversary would still need to brute force the reserve key, but at least it will have identified the time at which that private key came into operation.

RNR Reservoir Management

RNR Reservoir Size

In general, the communications volume and security needs of the individuals exchanging encrypted communications with this system will determine the ideal "size" for the reservoir RNR. "Size" indicates how many bits are stored for ultimate end use as an encrypting key E.

This size, if it is derived from the private key k, and remains secret, may add security against adversaries who attempt to reconstruct the RNR. It will have no added security against a brute force attack on the initial private key k.

It is important that the parties utilizing the present invention make a reasonably accurate projection of their communications needs over some unit of time. If this estimate is inaccurate, or communications needs change, another private key transfer may convey this information. Alternatively, this information may be transferred using this encryption system with a minimum of risk.

Adding Successive Samples (SMP) to the Reservoir (RNR)

The secrecy of the reservoir size may be further utilized by using a variety of techniques to integrate successive samples of the RDS into the existing reservoir of random bits so that the initial state and size of the RNR will influence future random numbers stored in the RNR. In other words, the RNR may be constructed from successive SMP so that an enemy would need the initial size of the reservoir, and all successive samples in order to reconstruct the random file in the reservoir at any given point in time.

Adding Overall Security

Further secrecy may be added using the simple additional methods described here. As indicated above, some or all of the bits from the sample, SMP, may be integrated into both the RNR and the original private key k, to form a new random key, k. The new random key k may be used as a new input into z, and, using the above methods, will generate a new time t, and a new sample SMP.

Those skilled in the art will recognize that is not necessary to integrate every SMP into the RNR. Instead, in certain embodiments it may be advantageous if the new SMP is only used to generate a new k, and the value is not integrated into the RNR. This process may be repeated many times (iterations). At the end of a predetermined number of iterations, a sample, SMP, will be diverted for use in the RNR.

Those skilled in the art will recognize there are many methods for integrating some random bits from SMP, back into k to create a new key. The bits from SMP may directly replace the same number of bits in k; s may be XORed with an equivalent number of bits; s may be XORs with same-sized blocks pulled from k so that each bit in k is XORed with the SMP. All these different processes are contemplated for incorporation with this cryptosystem.

In practical implementation, users will want to consider an enemy's capabilities and their own communications requirements before defining a size for k. In general, those with a high volume of messages per unit time will probably prefer to add computational complexity through repeated iterations, a sophisticated z, or a very long original k.

Alternative Sampling Method (Monitoring Method)

The private key k is transferred via secure courier, again preferably with no revelation to a potential adversary of the time of the exchange, and entered into the computer system. Each user's User Computer System $108n$ switches on and constantly monitors the incoming RDS for a string of random bits that precisely matches k. A sample SMP of s bits in length is taken after the last bit representing the key appears in the RDS. If s<k, then s will appear more frequently than k, resulting in a hash-type function, where long strings of bits of random length are reduced by a random process to a smaller, fixed length block of bits. This function could provide a hash-type function with a low probability of collision and, for memory bounded adversaries, a very strong one-way function that is computationally infeasible to reverse. As in the above method, some of the bits from SMP may be integrated with k to form a new k, and the process repeated. Multiple iterations are possible, resulting in substantial computational security.

This method has the disadvantage in that it demands more processing than the other embodiment. The RDS must be constantly monitored and analyzed, so fast processors are required. But there are several advantages. One is that the enemy must have considerable processing power. A brute force attack on k is probably the best attack, and that may require a considerable amount of time and processing power, especially if the time of the key exchange is uncertain. Even enemies with a considerable amount of plaintext will face considerable difficulty attacking this embodiment.

This method may also be used to validate a message, and insure that it has not been modified during its transmission through the public network. For example, returning to the above-described example of Alice and Bob, assume that Alice sends Bob an encrypted message, which Bob decrypts as described above. Bob's system and software segments the string of bits representing Bob's message into several distinct parts. These segments are then used as disclosed immediately above. Alice's system also breaks the original plaintext message into the exact same segments, using the same basic software and process. Alice and Bob then monitor the incoming RDS on a continuous basis, searching for an identical string of random bits that exactly matches the string of bits in the segments of plaintext. When a match is found, the both systems note and record the string of random bits immediately following the selected segment. Bob (the message recipient) then sends this string of random numbers (or series of numbers, one for each segment) to Alice. (This message may be encrypted.) Alice compares Bob's series of numbers with her series, and if they are the same, the message's contents can be validated.

Communication Between Individuals Without a Common Private Key

Figure 4:
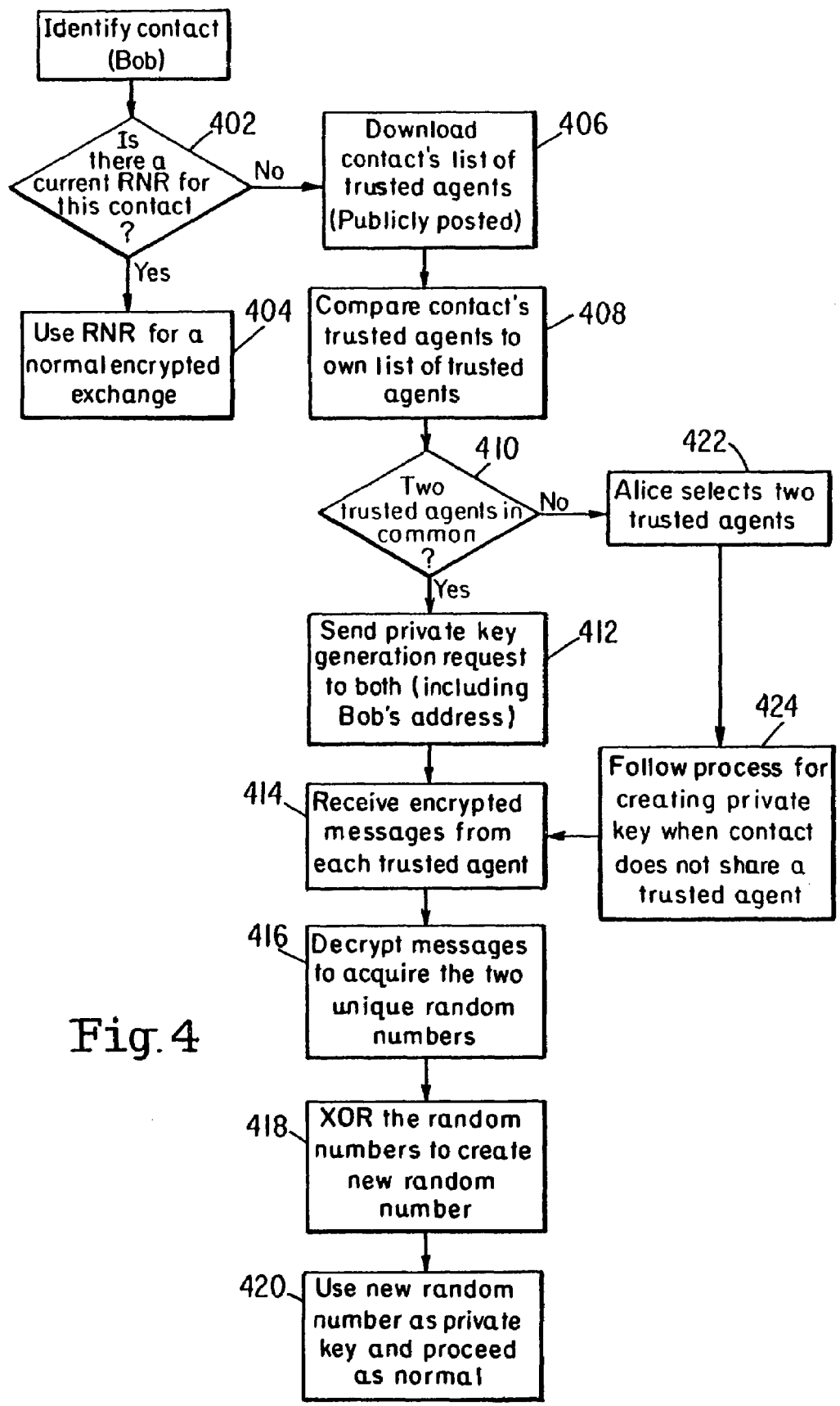
FIG. 4 is a flow chart depicting an example method of a transfer of private key, via trusted agent, within the method of FIG. 2.

The present invention contemplates secure communication between two individuals who have not exchanged a private key k, by their utilizing two or more trusted intermediaries, or trusted agents, whom both users have in common. The trusted agents will enable the users to create and exchange a new private key known only to the two individuals. This private key may be used in the system and methods described above to create synchronized RNRs for use in conducting secure communications. Referring to FIG. 4, an example operation is as follows:

At step 400 Alice identifies the intended contact as Bob. Next, at step 402 Alice checks if an RNR exists for Bob. If the answer is "Yes" the process goes to step 404 to encrypt and send the message using, for example, the method described in reference to FIG. 3. If step 402 determines that no RNR exists for Bob, i.e., Alice and Alice have not exchanged a private key, the process goes to step 406. Step 406 operates as follows: Alice and Bob each maintain reservoirs RNR synchronized with two trusted agents, whom they have in common, Zeke and Yvonne. That is, Bob has exchanged separate private keys with Yvonne and Zeke, and maintains synchronized RNRs with each so that Bob may conduct secret communications with Yvonne and Zeke, respectively. Alice has also exchanged separate private keys and similarly maintains separate synchronized RNRs with Yvonne and Zeke.

In an ideal embodiment, both Bob and Alice will publicly "broadcast" or "post" their trusted agents so that this knowledge is freely available. For example, this information may be posted on an individual's Web site or included in the individual's email address, or posted like a telephone number in a public directory.

Referring to FIG. 4, Alice downloads Bob's list of trusted agents at step 406 and, at step 408 compares the list with Alice's own list of trusted agents. If step 410 determines that Alice and Bob have two trusted agents in common the process goes to step 412 where Alice sends a private key generation request which includes Bob's address to both of the trusted agents, which is described further below. Assuming that the two trusted agents are Yvonne and Zeke, Bob will then use this information to send Alice a private key through Yvonne and Zeke. An enemy will have no idea that Bob has chosen to contact Alice—thus the private key transfer has remained secret in time as well as content. Other forms of exchange are contemplated, but they are not as secure. For example, Bob and Alice may exchange public messages indicating their wish to communicate in private. Even this limited public exchange allows the enemy to narrow the probability of the start time. Perfect secrecy may still be attained, but some entropy has been unnecessarily squandered.

As recited above, at step 412 Alice sends a "key generation request" to both Zeke and Yvonne that includes Bob's identity and address. Other instructions may be included in order to facilitate communications, or to confuse an adversary. Using a method described below in reference to FIG. 5, Zeke generates a random number A that he encrypts using the RNR he has in common with Bob, and passes the new random number to Bob. Zeke also sends the same random number A to Alice, as shown in FIG. 4, step 414, using the reservoir he has in common with Alice. Yvonne undertakes the same FIG. 5 process; creating and sending random number B in an encrypted message to both Alice and Bob.

Alternatively, Alice could generate two random numbers and pass one to Zeke as an encrypted message and one to Yvonne as encrypted message. Zeke and Yvonne "open" the message, obtain the random numbers, and then encrypt them using their RNRs that they have in common with Bob. They then pass these random numbers to Bob, per Alice's instructions.

Referring again to FIG. 4, at step 416 Alice and Bob receive the messages from Zeke and Yvonne. Then, at step 418 a new secrecy key is generated by Bob and Alice by each XORing the two random numbers A and B to create a third number, C. This is the new private key, which is then used at step 420 in the manner disclosed above in reference to FIG. 3.

The FIG. 4 process described above is for the example when Alice's step 412 determines that Alice and Bob share two trusted agents in common. If step 412 does not determine two trusted agents in common the process goes to step 422 where Alice selects two of her trusted agents. Then, the process goes to step 424, which is the process shown at step 200 of FIG. 3 for creating and exchanging a private key k when contact (Bob in this example) does not share trusted agents with the sender (Alice).

As long as Zeke and Yvonne do not collude, Bob and Alice may exchange perfectly secure communications.

Further security against collusion may be obtained by increasing the number of agents. Each agent will be used to transfer a separate random number to the desired party. Each random number will be required to form the final private key, created by XORing each private key in turn. Increasing the number of agents to more than two makes it more and more difficult to coordinate collusion, yet unanimous participation is required for an adversary to gain information on the private key.

For certain embodiments, it would be advantageous to create a network of trusted agents that have a minimum of memory, or memory that automatically expires, so that the trusted agent retains no record of the random number it created for Bob and Alice. If the trusted agent retains no record, future leakage of all information on its RNRs will not reveal the private keys exchanged by Bob and Alice. Such memoryless servers would be ideal for facilitating communications on a public network, or where there may be high penalties for a compromised agent.

Figure 5:
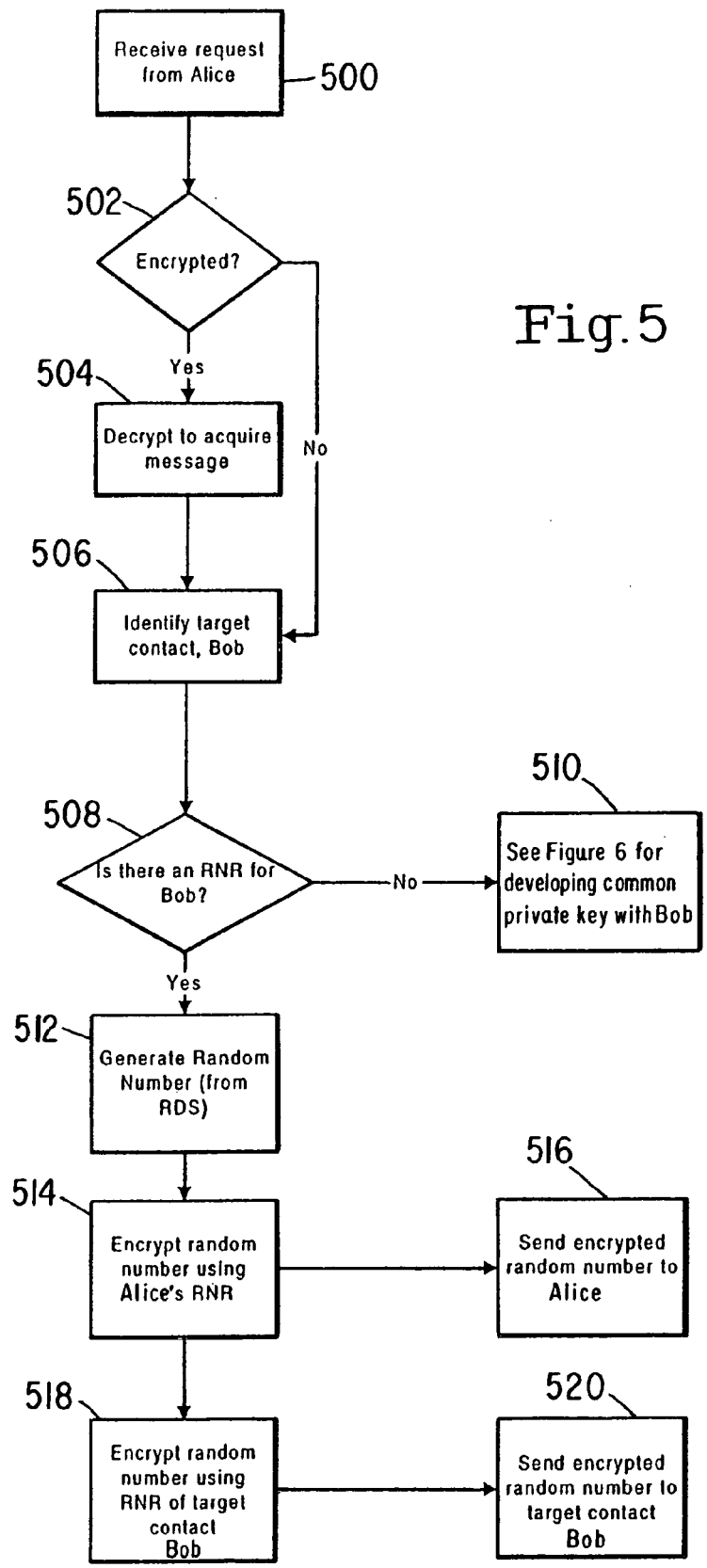
FIG. 5 is a flow chart depicting an example of a trusted agent handling a private key generation request within the method of FIG. 2.
Figure 9:
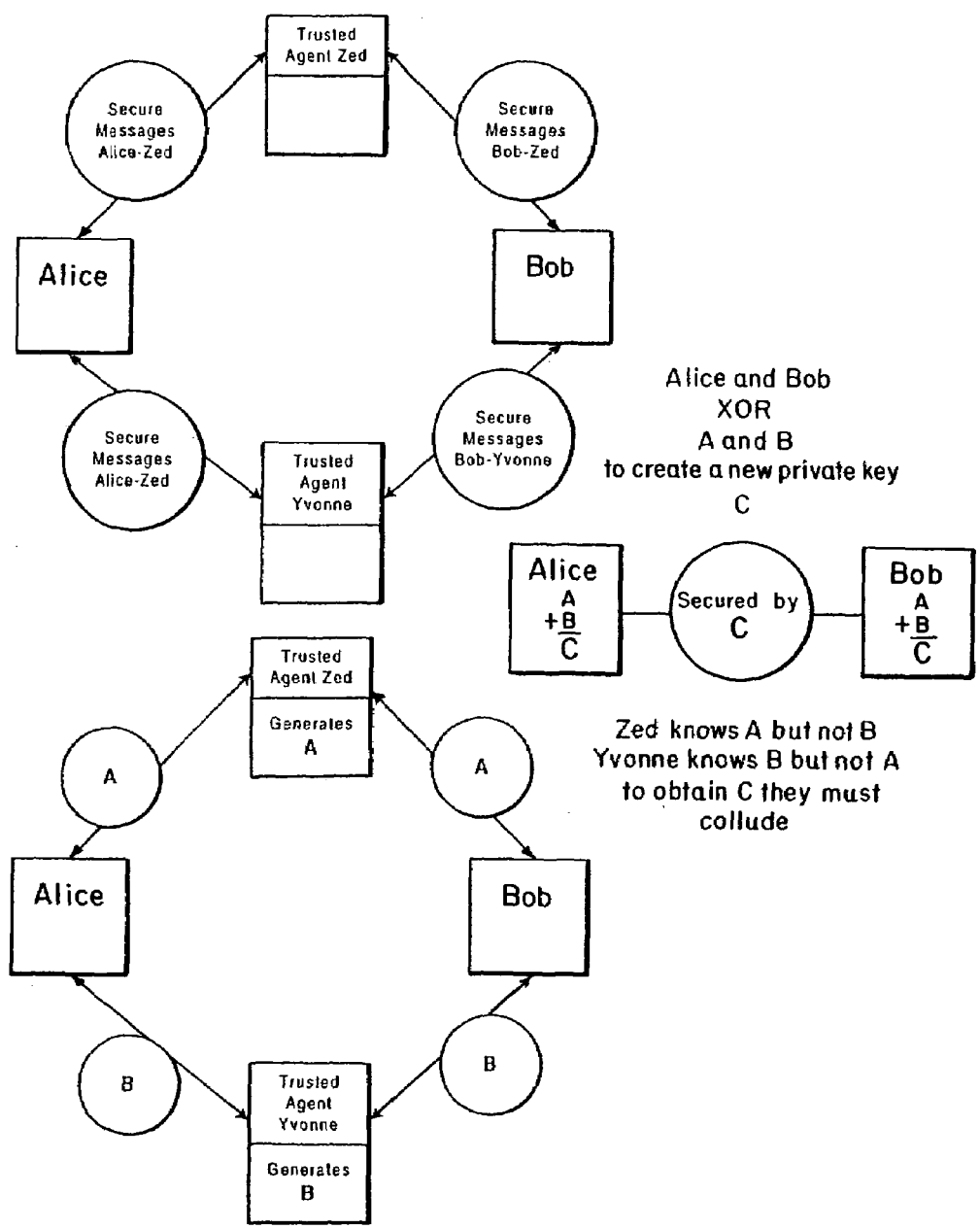
FIG. 9 depicts an example private key exchange between two users having respective trusted agents.

FIG. 5 describes one possible method for utilizing two trusted intermediaries to exchange a secure private key, as viewed from the perspective of the trusted intermediary (or "agent"). The process starts when the trusted agent receives a message from Alice (500). (This process should be identical both of the trusted agents involved in this process of exchanging a secure private key.) The agent will quickly determined if this message is encrypted (502), and if it is, will decrypt (502) using the appropriate RNR for Alice. It is preferable for Alice to encrypt the message to the trusted agent in order to reduce the information a potential adversary may have regarding the time of the private key exchange between Alice and Bob. Whether or not the original message is encrypted, the message will reveal that Bob is target contact (506). The trusted agent will search its records to evaluate whether or not it has an ongoing RNR in common with Bob (508). (It has exchanged a private key in the past and formed a trusted relationship.) If there is no common RNR with Bob, the trusted agent can undertake a process to determine if it has two other trusted intermediaries in common with Bob (510, and see FIG. 6). Although Bob and the trusted agent do not have an established private key, they may in turn have exchanged private keys with two other trusted agents whom they both have in common. (Thus the trusted agent in this process now acts like Bob and Alice, who do not have a trusted agent in common.) If Bob and the trusted agent do indeed have an RNR in common (the trusted agent for Alice is also a trusted agent for Bob), then the agent will generate a new random number, in most cases using the RDS (512). This random number will then be encrypted using Alice's RNR (514) and sent to Alice (516). The same random number will also be encrypted using Bob's RNR (518) and sent to Bob (520). Alice and Bob will each decrypt this message from the trusted agent revealing the trusted agent's random number; this process will be repeated for the other trusted agent. Then Bob and Alice will XOR the two random numbers to obtain a new and unique random number that may function as a secure private key. (See FIG. 9.)

Figure 6:
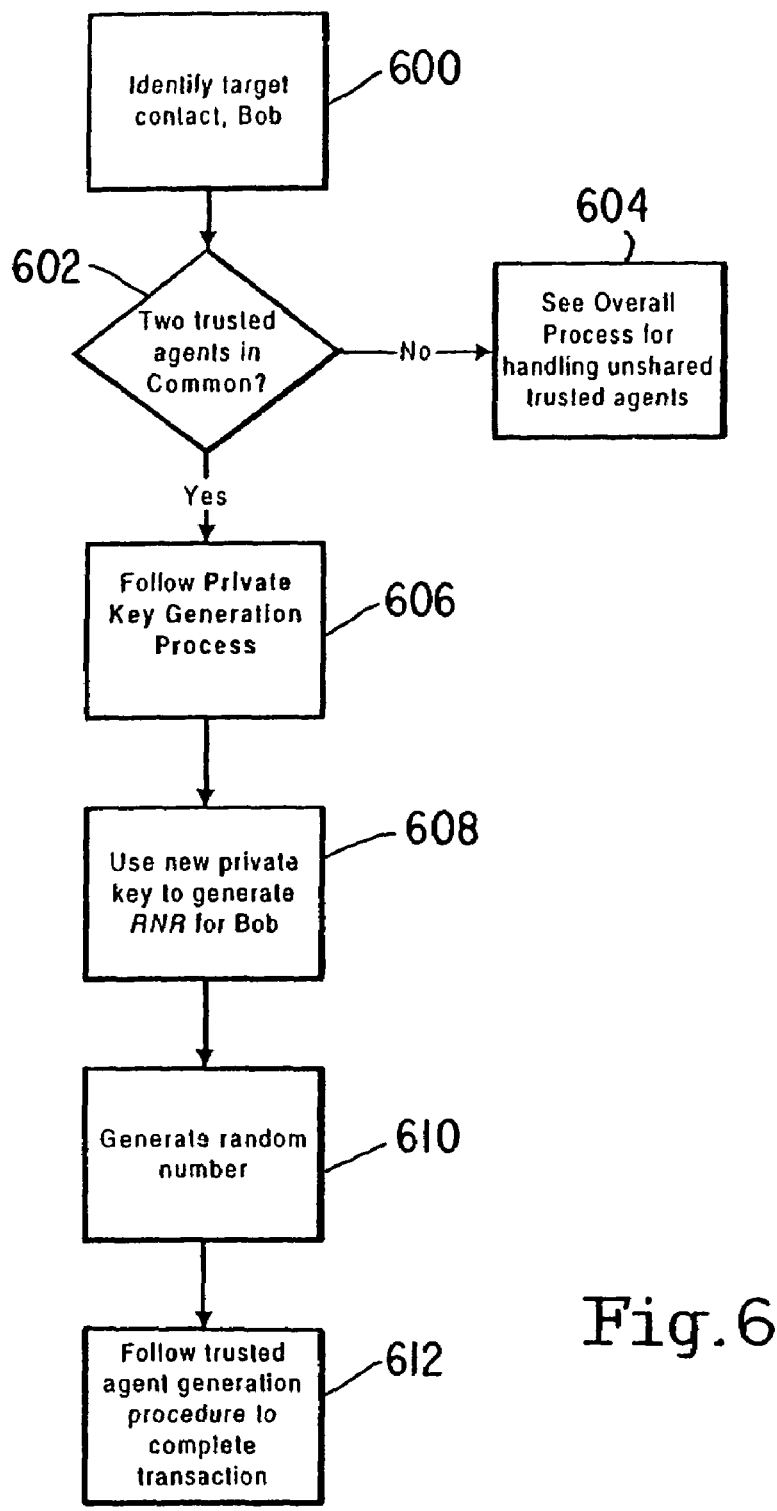
FIG. 6 is a flow chart depicting an example alternative method to that of FIG. 4 for transferring a key via trusted agent.
Figure 8:
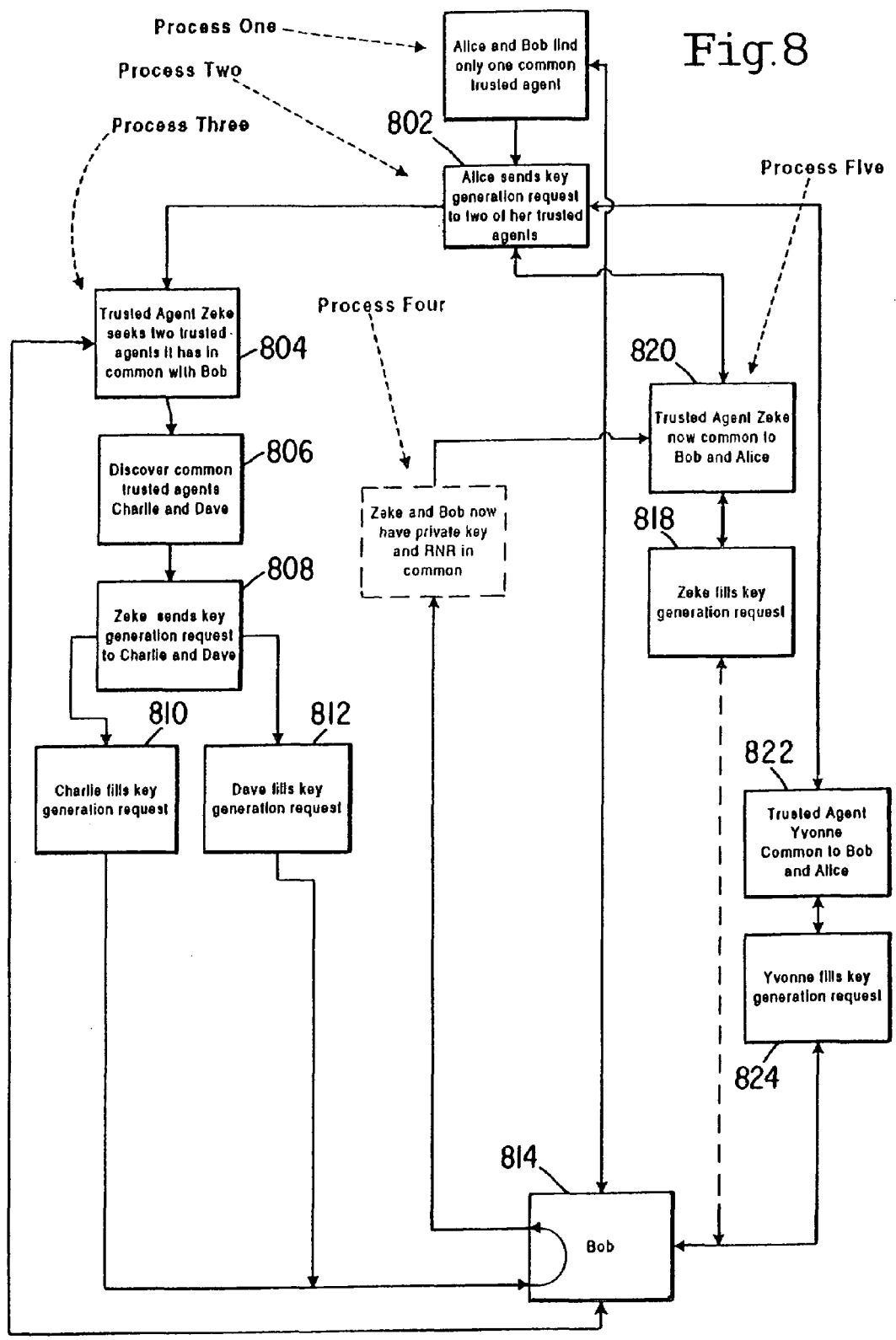
FIG. 8 is a flow chart showing an example method of generating private key when there is only one trusted agent in common between two users.

FIG. 6 represents the basic subroutine that the trusted agent may take when it encounters the situation in FIG. 5 (510) where it is handling a random key generation request from Alice, but has no RNR in common with Bob. The objective is to create a private key and subsequent RNR between the trusted agent and Bob so that the agent may then, in turn, provide the trusted agent service described in FIG. 5 for Alice. If this trusted agent does not have two trusted agents in common with Bob, it will seek out other trusted agents who may have the necessary secure RNRs in common with Bob. (604, and also see FIG. 8 for a broader overview). If the trusted agent does indeed find two other trusted agents it has in common with Bob, it will use these agents to create a secure private key it has in common with Bob (see FIG. 5) and will then form a new RNR in common with Bob (608). Processes 610 and 612 represent the trusted agents efforts to complete the transaction requested by Alice—these last steps replicate the actions taken in FIG. 5. Together, FIGS. 5, 6, and 8 represent how the same basic processes may be repeated so that individuals who have never met may utilize a network of trusted agents to exchange a secure private key that will form the foundation for a secure RNR. As long as this network of trusted agents does not collude or disclose other information about the messages it has exchanged with Bob and Alice (or other users with whom the trusted agents has formed ongoing RNRs) then the encryption system will be able to allow individuals who have never met to exchange secure private keys through a public network. Those skilled in the art will quickly appreciate that users need not confine themselves to using two trusted intermediaries to exchange a secure private key; there are advantages to increasing the number of trusted intermediaries. As the number increases, an adversary will need to successfully attack each trusted intermediary in order to obtain information about the private key exchanged by Bob and Alice. This large network of trusted agents thus reduces the "fat target" problem, where a single trusted intermediary represents an ideal target for an adversary because it contains information on multiple keys and individual users.

Figure 7:
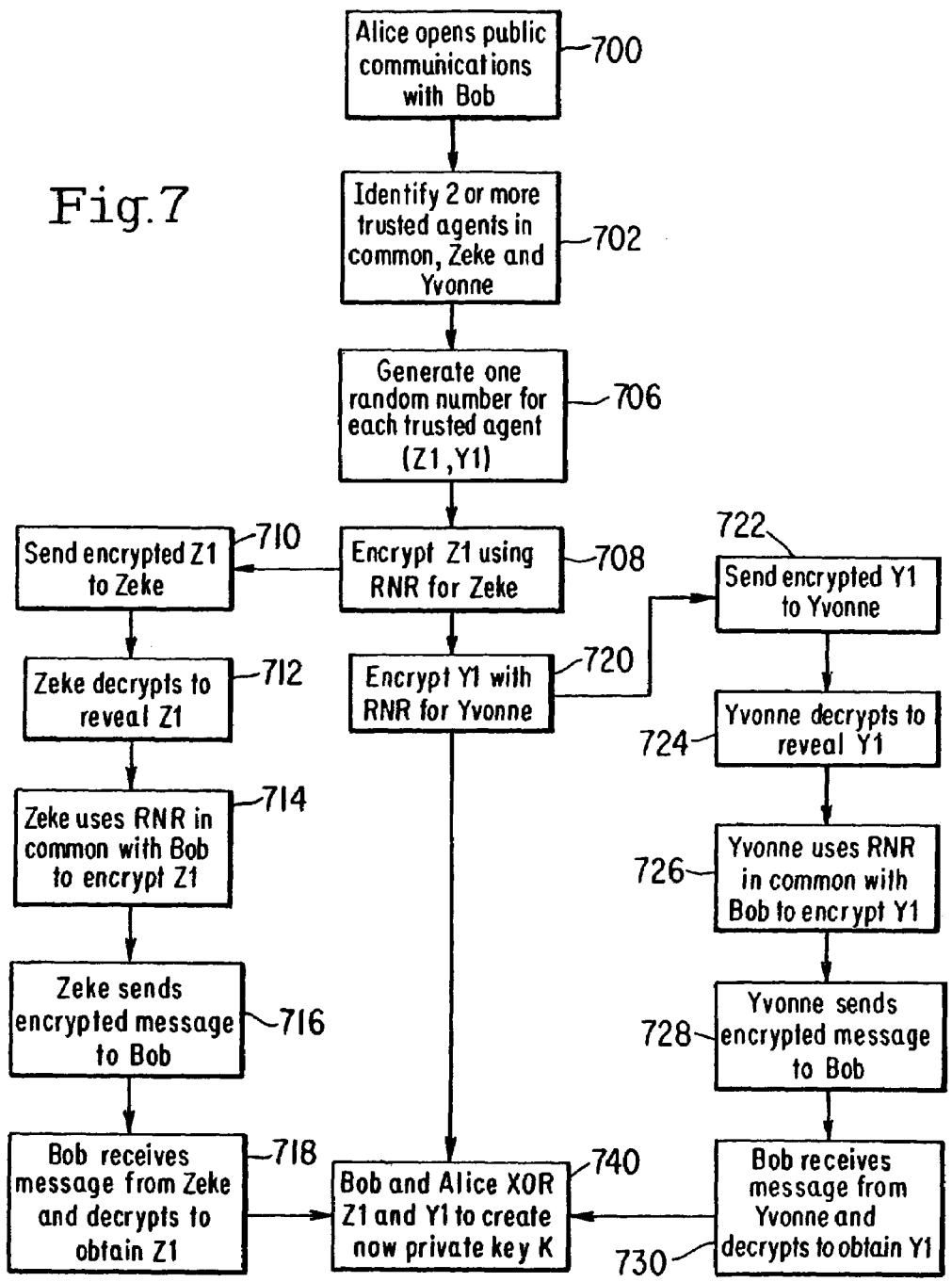
FIG. 7 is a flow chart showing an example method of using two trusted agents for securing a private key within the method of FIG. 2.

FIG. 7 describes an alternative process for using two trusted agents to create and transfer a secure private key between two individuals, Alice and Bob, who have never met or exchanged a private key but do have two trusted agents in common. To start to the process, Alice will contact Bob through a public channel (700), indicating that she wants to develop a secure private key in common with Bob so that they may conduct secure private communications. In this public discussion, represented by 702, the two users will exchange information about their trusted agents and will identify two that they both have in common. Alice will then generate two random numbers (706), one for Zeke (Z1), and one for Yvonne (Y1). Z1 will be encrypted using the RNR for Zeke (708) and the encrypted message will be sent to Zeke (710); Y1 will be encrypted using the RNR in common with Yvonne (720), and the resulting encrypted message sent to Yvonne (722). Both Zeke and Yvonne will decrypt the encrypted message (712 and 724, respectively), revealing the random numbers. (Zeke will now know Z1, and Yvonne knows Y1.) Zeke will now encrypt Z1 using an RNR he has in common with Bob (714), and will send the resulting encrypted message to Bob (716). Yvonne will encrypt Y1 using the RNR she has in common with Bob (726), and will send the resulting encrypted message to Bob (728). Bob will decrypt Zeke's incoming encrypted message using his Zeke RNR to reveal Z1 (718); Bob will also decrypt Yvonne's incoming encrypted message to reveal Y1 (730). Now Bob will XOR Z1 and Y1 to create a new random number; Alice will also XOR Z1 and Y1 to create the exact same private key, K. (740) The advantage of this method is that as long as Zeke and Yvonne do not collude, neither will be able to obtain the ultimate private key, K, created from the XOR of Z1 with Y1.

In an alternative embodiment, information on trusted intermediaries may be publicly posted, such as on a Web site. In this scenario, Alice may scan Bob's Web site, and identify two trusted intermediaries that she has common with Bob without Bob's knowledge. Alice will then use the above process to transfer a private key to Bob. Bob will not know that the incoming communications from his trusted agents Zeke and Yvonne carries a random number that is to be used to construct a secure private key in common with Alice, but he may easily informed by both Zeke and Yvonne of the purpose of this particular secret communication. The objective and end result is to again create uncertainty for an adversary regarding the time of the private key exchanged between Alice and Bob. Unless the adversary has logged all visitors to Bob's Web site, the adversary will be unable to identify precisely when Alice sent Bob a private key.

FIG. 8 incorporates the processes described in FIGS. 5 and 6 to provide an "overview" of how successive layers of trusted agents may network together to deliver secure private keys to two individuals (Bob and Alice) who have never met. In step 800, Bob and Alice discover only one trusted agent in common, so Alice sends a key generation request to Yvonne (802) (whom is common to Alice and Bob) and also to Zeke, who has a trusted RNR in common with Alice but not Bob. Yvonne follows the process explained in FIG. 5 (822 and 824). Zeke's process (804–820) is another representation of the process described for FIG. 6. Zeke and Bob both try to find common trusted agents (804 and 806) and use these agents (808, 810, and 812) to first generate a secure private key (814) with Bob and a secure RNR. When this is completed (820) Zeke will now have RNRs in common with both Bob and Alice, allowing Zeke to fulfill the private key generation request from Alice (818). Again, those skilled in the art will appreciate that this is a representation how a network of trusted agents can communicate through public channels and use the same basic processes to allow users who have never met to exchange private keys. With enough time, the repetition of this process will eventually create a large network of trusted agents and users who may facilitate the exchange of private keys through a public network—without requiring the use of an expensive trusted courier. Instead, the network of trusted agents has replaced the courier, thus allowing decreases in cost, and potentially, substantial increases in the speed of private key exchanges.

The advantages of these methods are substantial. In a networked environment, such as the public Internet, it is possible that any individual user would need to use a trusted courier or other equally secure means of exchanging a private key only twice to create two trusted agents. If these trusted agents have exchanged private keys with two other trusted agents, and so on, then any individual user could then utilize the network of trusted agents to create and exchange a private key with any other individual user over the public Internet. This is a considerable advantage over the current art of private key cryptography, because it substantially reduces the key management problem related to constantly utilizing expensive couriers to transfer private keys. In a networked environment with a sufficient number of trusted agents, or a few trusted agents with many connections to users, any individual user would need to use a trusted courier only twice, to establish secure keys with two separate trusted agents. All other private keys with all other users could be developed through secure communications with the two trusted agents over the public network. It is also an advance over public key systems in the sense that after absorbing the initial cost of conducting a secure key exchange with two trusted agents, the cost and complexity of using the present invention in a network will be substantially less in time and cost (and greater in security) than a public key system implemented to achieve similar applications and transactions.

In many applications, such as in using this system and methods to conduct financial transactions, the use of two trusted agents may be used to introduce a measure of anonymity in a purchase, either with the seller, or the financial institution, or both.

The use of the trusted agents in this system has the further advantage that neither trusted agent will be able to identify the value of the newly created private key k unless the two trusted agents collude. This collusion is unlikely in a commercial setting because presumably the trusted agent would generate revenue based on its trustworthiness, that is, its expressed statement that it will never collude.

Yet it is an advantage of the present invention that law enforcement officials possessing proper and valid search warrants may request the random number provided by each trusted agent to each user, and then use these numbers to recreate the private key, k. The law enforcement organization may then be able to recreate the RNRs and encrypted communications of the two users, but only if the law enforcement organization has a substantial portion of the RDS for the time period covered by the private key k. Furthermore, it is an advantage that the search warrant can be very specific: the law enforcement organization will recreate the private key and subsequent communications only for the communications between two specific users. The other communications between any one user and his or her other contacts will not be accessible. This is a substantial advantage over public key systems where revelation of a user's public key through a search warrant would enable the law enforcement agency to examine all the user's incoming communications, not just the targeted communications between the two users.

Financial Transactions

Those skilled in the art will readily appreciate that this system and methods may be applied to create secure electronic financial transactions. One process, though not the only one, enables a buyer, Bob, to purchase from a seller, Alice, without ever revealing the actual credit card number or account information to Alice. More specifically, assume that Bob is making an electronic purchase over the Internet using a credit card accepted by Alice. Both Bob and Alice have exchanged private keys with a trusted agent they both have in common, perhaps a financial institution such as a credit card company.

To utilize this system to exchange payment and credit card information, Bob obtains the price of the goods he wishes to purchase, plus other unique information identifying Alice (such as a bank routing number for payment), if necessary. Bob places this information and his credit card number inside a message in a predetermined format so that it may be quickly processed by the trusted agent. Bob encrypts this message with the RNR he has in common with the credit card company and the trusted agent. He may then pass the encrypted message directly to the trusted agent or back to Alice. If Bob passes the message to the credit card company, the credit card company decrypts the message to obtain Bob's credit card number, the amount Bob wishes to withdraw or charge, and the destination of the funds. The credit card company may now pass this information to and confirm the transaction with Alice, using the RNR shared by the company and Alice. The hash-type function described in the "Alternative Methods" section above may be used to validate and "sign" all the messages.

Many other methods are contemplated using this system and its methods to implement secure financial transactions. For example, trusted agents with large numbers of "clients" (customers with whom the agent has exchanged private keys and maintains an RNR) may rapidly create a type of currency from issuing random numbers that represent specified amounts of currency, securities, or other elements traditionally used to represent or hold value in a financial transaction.

Two trusted intermediaries may be used to generate some anonymity in transactions. Assume, for example, two common trusted intermediaries, Zeke and Yvonne, and a buyer and seller, Bob and Alice, who have exchanged private keys and enjoy secure communications with each party. Bob generates a random number, encrypts it using Alice's RNR, and sends it to Alice. Bob then sends this same random number, encrypted, to Zeke, plus payment information but Alice's name is not included in the information. The random number generated by Bob for Alice and Zeke will substitute for Alice's name. Alice sends this same random number (encrypted) to Yvonne, plus information on Zeke so that Yvonne may quickly identify with whom she should communicate. Assuming that Yvonne already enjoys secure communications with Zeke, she may now present the random number to Zeke, who then transfers the appropriate value requested by Bob to Yvonne. Yvonne, of course, then transfers this value to Alice's account, and confirms the transaction for Alice. The use of two trusted intermediaries and blind random numbers inserts an extra layer in a normal financial transaction to obtain some limited anonymity without losing any security or ability to prevent copying or repudiation. Zeke does not know whom Bob is paying; Yvonne does not know from whom Alice is receiving payment.

Those skilled in the art will readily appreciate these techniques, and will conceive of many others using the basic principles disclosed above for the operation of the present invention's system and methods. The main advantages of financial transactions conducted with the present invention over the prior art of encryption (public and private key) are that the present invention conducts transactions that are faster, more secure, and lower in cost. This combination of speed, security, and cost enables users and trusted agents of this system and methods to rapidly and inexpensively conduct many sub-transactions and exchanges of information without incurring a security risk. Layering transactions enables the creation of buffers that provide anonymity; multiple sub-transactions allows trusted agents to rapidly transfer value across a diverse public network, enabling widespread electronic commerce between users and other institutions who have never met. Other systems based on the prior art of encryption could not conduct multiple layers of transactions without imposing very high costs and long wait times upon the buyers and sellers.

Authentication with Two Trusted Intermediaries

One critical advantage of this system is that the exchange of private keys, k, also provides an inherent mechanism for identifying and authenticating the identity of the other party to the satisfaction of both users. The process of exchanging the private key also becomes the point in time at which each user authenticates the identity of the other user. Future encrypted messages exchanged between these two users are thus inherently authenticated with a very low risk that an adversary has substituted a false message.

While the foregoing invention has been described with specific references to examples of its preferred embodiments, it should be understood that various substitutions, variations, and modifications may be made thereto without departing from the scope of the invention as defined in the appended claims.

I claim:

1. A method for encrypting data comprising:
    broadcasting a random number sequence greater than N bits;
    broadcasting a synchronization signal;
    generating a private key;
    providing said private key to an encryption station and to a decryption station;
    receiving said random number sequence at said encryption station and said decryption station;
    receiving said synchronization signal at said encryption station and at said decryption station;
    selecting at time t an encrypting subsequence from said random number sequence received at said encryption station, said selection time t based on said synchronization signal received at said encryption station and on said private key;
    filling an encryption reservoir with data from said encrypting subsequence;
    updating a bit count of said encryption reservoir in accordance with said filling;
    generating another selection time t' based on at least said encrypting subsequence;
    selecting at time t' another subsequence from said random number sequence received at said encryption station;
    additionally filling said encryption reservoir with data from said another subsequence;
    updating said bit count of said encryption reservoir based on said additionally filling;
    updating said selection time t' to represent a future time, based on at least said another subsequence;
    repeating said selection at time t', said additional filling, said updating said encryption reservoir bit count, and said updating said selection time t' until said encryption reservoir bit count reaches a predetermined fill value based on a predetermined value N;
    establishing an N-bit encryption key based on said encryption reservoir;
    providing a message symbol sequence to said encryption station;
    encrypting said message symbol sequence, at said encryption station, based on said N-bit encryption key, into an encrypted symbol sequence.

2. A method for encrypting data according to the claim 1, further comprising:
    generating an N-bit decrypting key at said decrypting station, identical to said N-bit encrypting key, said generating including
        (a) selecting at said time t said encrypting subsequence from said random number sequence received at said decryption station, said selection time t based on said synchronization signal received at said decryption station and on said private key,
        (b) filling a decryption reservoir with data from said encrypting subsequence,
        (c) updating a bit count of said decryption reservoir in accordance with said filling,
        (d) generating another selection time t' based on at least said another subsequence,
        (e) selecting at time t' another subsequence from said random umber sequence received at said decryption station,
        (f) additionally filling said decryption reservoir with data from said another subsequence,
        (g) updating said bit count of said decryption reservoir based on said additionally filling,
        (h) updating said selection time t' to represent a future time, based on at least said another subsequence,
        (i) repeating (e) through (h) until said decryption reservoir bit count reaches a predetermined fill value based on a predetermined value N, and
        (j) establishing an N-bit decryption key based on said decryption reservoir;
    transmitting said encrypted message symbol sequence from said encryption station to said decryption station; and
    decrypting said encrypted message symbol sequence, at said decryption station, based on said decrypting key, into said message symbol sequence.

3. A method according to claim 2, wherein said synchronization signal is embedded in said broadcast random number sequence.

4. A method according to claim 1 wherein said transmitting the random number sequence includes:
    transmitting said random number sequence by uplink up to a satellite; and
    transmitting said random number sequence received by said satellite down to said encryption station and to said decryption station.

5. A method according to claim 2 wherein said transmitting the random number sequence includes:
    transmitting said random number sequence by uplink up to a satellite; and
    transmitting said random number sequence received by said satellite down to said encryption station and to said decryption station.

6. A method according to claim 3 wherein said transmitting the random number sequence with embedded synchronization signal includes:
    transmitting said random number sequence and embedded synchronization signal via uplink up to a satellite; and
    transmitting said random number sequence received by said satellite down to said encryption station and to said decryption station.

7. A method for generating an N-bit encrypting key, comprising:

broadcasting a random number sequence having significantly greater than N bits;
generating a private key;
providing said private key to an encrypting station;
receiving said random number sequence at said encrypting station;
generating an encrypting station sampling start time t based on said private key;
sampling a plurality of bits from said random number sequence received at said encrypting station, over a time interval based on said encrypting station sampling start time t, said plurality being less than N bits;
filling an encryption key reservoir at said data encryption station based on said sampled plurality of bits;
generating an updated encrypting station start time t', based on at least said plurality of bits;
sampling another plurality of bits from said random number sequence received at said encrypting station, over a time interval based on said updated encrypting station sampling start time t', said plurality being less than N bits;
further filling said encryption key reservoir based on said another plurality of bits from said transmitted random sequence;
repeating said generating an updated encrypting station start time t', said sampling another plurality of bits, and said further filling said encryption key reservoir until said encryption key reservoir reaches a predetermined bit count based on N; and
setting said N-bit encrypting key based on said encryption key reservoir.

8. A method according to claim 7, further comprising generating an N-bit decrypting key identical in value to said N-bit encrypting key, said generating comprising:
providing said private key to a decrypting station;
receiving said random number sequence at said decrypting station;
generating a decrypting station sampling start time td based on said private key, said generating performed such that said decrypting station sampling start time td is identical to said encrypting station sampling start time t;
sampling a plurality of bits from said random number sequence received at decrypting station, over a time interval based on said decrypting station sampling start time td, said plurality being less than N bits;
filling a decryption key reservoir at said data decryption station based on said sampled plurality of bits;
generating an updated decrypting station sampling start time td', based on at least said plurality of bits;
sampling another plurality of bits from said random number sequence received at said decrypting station, over a time interval based on said updated decrypting station sampling start time td', said plurality being less than N bits;
further filling said decryption key reservoir based on said another plurality of sampled bits;
repeating said generating an updated decrypting station sampling start time td', said sampling another plurality of bits, and said further filling said decryption key reservoir until said decryption key reservoir reaches a predetermined bit count based on N bits; and
setting said N-bit decrypting key based on a value of said decrypting key reservoir,
wherein said generating a decrypting station sampling start time td, said filling a decryption key reservoir, said generating an updated decrypting stating sampling start time td', said further filling said decryption key reservoir, and said repeating are performed such that said decryption key reservoir and said encryption key reservoir are identically filled.

9. A method according to 8, further including:
generating a synchronization signal; and
receiving said synchronization signal at at least one of said encryption station and said decryption station,
wherein at least one of said sampling a plurality of bits at said encryption station and said decryption station is further based on said received synchronization signal.

10. A method according to claim 7, further comprising
inputting a block of information into said encrypting station;
encrypting said block of information based on said N-bit encrypting key into an encrypted block of information;
transmitting said encrypted block of information from said encrypting station to said decrypting station; and
decrypting said encrypted block of information at said decrypting station based on said N-bit decrypting key.

11. A method according to claim 7, further including:
generating a synchronization signal; and
receiving said synchronization signal at said encryption station,
wherein said sampling a plurality of bits is further based on said received synchronization signal.

12. A method according to claim 11 wherein said transmitting the random number sequence with embedded synchronization signal includes:
transmitting said random number sequence and embedded synchronization signal via uplink up to a satellite; and
transmitting said random number sequence received by said satellite down to said encryption station and to said decryption station.

13. A method for encrypting data, comprising:
broadcasting a random number sequence greater than N bits;
providing a private key to a first communication station;
receiving said random number sequence at said first communication station;
repeatedly filling a first reservoir at said first communication station with selected bits from said received random number sequence, each selection based on at least one of said private key and a value of previously selected bits, until said first reservoir reaches a predetermined threshold based on N;
setting an N-bit encryption key based on the content of said first reservoir;
inputting an information data; and
encrypting said information data into an encrypted data based on said N-bit encryption key.

14. A method according to claim 13, further comprising:
providing said private key to a first communication station;
receiving said random number sequence at said second communication station;
repeatedly filling a second reservoir at said second communication station with selected bits from said received random number sequence, each selection based on at least one of said private key and a value of previously selected bits, until said first reservoir reaches a predetermined threshold based on N, wherein said repeated filling and selection are carried out such that said second reservoir is filled to match said filling of said first reservoir;

setting an N-bit decryption key based on the content of said second reservoir, whereby said N-bit decryption key matches said N-bit encryption key;

receiving said encrypted data; and decrypting said encrypted data based on said N-bit decryption key.

* * * * *